(12) United States Patent
Maeda et al.

(10) Patent No.: US 11,884,989 B2
(45) Date of Patent: Jan. 30, 2024

(54) HOT-STAMPING FORMED BODY

(71) Applicant: NIPPON STEEL CORPORATION, Tokyo (JP)

(72) Inventors: Daisuke Maeda, Tokyo (JP); Yuri Toda, Tokyo (JP); Tomohito Tanaka, Tokyo (JP); Kazuo Hikida, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 171 days.

(21) Appl. No.: 17/599,935

(22) PCT Filed: May 13, 2020

(86) PCT No.: PCT/JP2020/019129
§ 371 (c)(1),
(2) Date: Sep. 29, 2021

(87) PCT Pub. No.: WO2020/241260
PCT Pub. Date: Dec. 3, 2020

(65) Prior Publication Data
US 2022/0195557 A1    Jun. 23, 2022

(30) Foreign Application Priority Data
May 31, 2019    (JP) ................. 2019-101985

(51) Int. Cl.
*B32B 15/01*    (2006.01)
*C21D 9/48*    (2006.01)
(Continued)

(52) U.S. Cl.
CPC .............. *C21D 9/48* (2013.01); *B32B 15/013* (2013.01); *C21D 1/18* (2013.01); *C21D 6/002* (2013.01);
(Continued)

(58) Field of Classification Search
None
See application file for complete search history.

(56) References Cited

U.S. PATENT DOCUMENTS

2012/0321903 A1    12/2012   Nakamaru et al.
2013/0252017 A1    9/2013    Nakajima et al.
(Continued)

FOREIGN PATENT DOCUMENTS

EP    2 684 985 A1    1/2014
JP    2006-89787 A    4/2006
(Continued)

*Primary Examiner* — Humera N. Sheikh
*Assistant Examiner* — Kim S. Horger
(74) *Attorney, Agent, or Firm* — Birch, Stewart, Kolasch & Birch, LLP

(57) ABSTRACT

A hot-stamping formed body includes: a steel sheet having a predetermined chemical composition; and a plating layer provided on a surface of the steel sheet, the plating layer having an adhesion amount of 10 g/m$^2$ to 90 g/m$^2$ and a Ni content of 10 mass % to 25 mass %, and containing a remainder consisting of Zn and impurities. The hot-stamping formed body includes, in a surface layer region of the steel sheet, an average grain size of prior austenite grains to 10.0 μm or less, a Ni concentration per unit area at grain boundaries having an average crystal orientation difference of 15° or more is 1.5 mass %/μm$^2$ or more.

3 Claims, 1 Drawing Sheet

(51) Int. Cl.
  *C21D 1/18* (2006.01)
  *C21D 6/00* (2006.01)
  *C21D 8/04* (2006.01)
  *C22C 18/00* (2006.01)
  *C22C 38/00* (2006.01)
  *C22C 38/02* (2006.01)
  *C22C 38/06* (2006.01)
  *C22C 38/26* (2006.01)
  *C22C 38/28* (2006.01)
  *C22C 38/32* (2006.01)
  *C22C 38/38* (2006.01)

(52) U.S. Cl.
  CPC ............ *C21D 6/005* (2013.01); *C21D 6/008* (2013.01); *C21D 8/0405* (2013.01); *C21D 8/0426* (2013.01); *C21D 8/0436* (2013.01); *C21D 8/0463* (2013.01); *C22C 18/00* (2013.01); *C22C 38/001* (2013.01); *C22C 38/002* (2013.01); *C22C 38/005* (2013.01); *C22C 38/02* (2013.01); *C22C 38/06* (2013.01); *C22C 38/26* (2013.01); *C22C 38/28* (2013.01); *C22C 38/32* (2013.01); *C22C 38/38* (2013.01); *C21D 2211/001* (2013.01); *C21D 2211/008* (2013.01)

(56) References Cited

U.S. PATENT DOCUMENTS

| | | |
|---|---|---|
| 2015/0027596 A1 | 1/2015 | Miyoshi et al. |
| 2018/0023162 A1 | 1/2018 | Sugiura et al. |
| 2019/0390295 A1 | 12/2019 | Nakagawa et al. |

FOREIGN PATENT DOCUMENTS

| | | | |
|---|---|---|---|
| JP | 2012-172203 A | | 9/2012 |
| JP | 2012-197505 A | | 10/2012 |
| JP | 2012-233249 A | | 11/2012 |
| JP | 2015161023 A | * | 9/2015 |
| JP | 5861766 B2 | | 2/2016 |
| JP | 2016-125101 A | | 7/2016 |
| JP | 6428970 B1 | | 11/2018 |
| KR | 10-2012-0049955 A | | 5/2012 |
| WO | WO 2016/132545 A1 | | 8/2016 |

* cited by examiner

HOT-STAMPING FORMED BODY

TECHNICAL FIELD OF THE INVENTION

The present invention relates to a hot-stamping formed body. Specifically, the present invention relates to a hot-stamping formed body excellent in strength and hydrogen embrittlement resistance applied to a structural member and a reinforcing member of a vehicle or a structure that requires hydrogen embrittlement resistance.

Priority is claimed on Japanese Patent Application No. 2019-101985, filed May 31, 2019, the content of which is incorporated herein by reference.

BACKGROUND ART

In recent years, there has been a demand for a reduction in the weight of the vehicle body of a vehicle from the viewpoint of environmental protection and resource saving, and a high strength steel sheet has been increasingly applied to a member for a vehicle. A member for a vehicle is manufactured by press forming. However, with the high-strengthening of a steel sheet, not only is a forming load increased, but also formability decreases. In addition, in a high strength steel sheet, formability into a member having a complex shape becomes a problem. In order to solve such a problem, a hot stamping technique in which press forming is performed after heating to a high temperature in an austenite region where the steel sheet softens has been applied. Hot stamping has attracted attention as a technique that achieves both forming into a member for a vehicle and securing strength by performing a hardening treatment in a die simultaneously with press working.

However, in general, as the dislocation density of steel increases, the sensitivity to hydrogen embrittlement increases, and hydrogen embrittlement cracking occurs with a small amount of hydrogen. Therefore, in a hot-stamping formed body in a related art, there are cases where an improvement in hydrogen embrittlement resistance is a major problem.

Patent Document 1 discloses a technique in which the crystal orientation difference in bainite is controlled to 5° to 14° by controlling the cooling rate from finish rolling to coiling in a hot rolling step, thereby improving deformability such as stretch flangeability.

Patent Document 2 discloses a technique in which the strength of a specific crystal orientation group among ferrite grains is controlled by controlling manufacturing conditions from finish rolling to coiling in a hot rolling step, thereby improving local deformability.

Patent Document 3 discloses a technique in which a steel sheet for hot stamping is subjected to a heat treatment to form ferrite in the surface layer and thus reduce gaps generated at the interface between ZnO and the steel sheet and the interface between ZnO and a Zn-based plating layer during heating before hot pressing, thereby improving pitting corrosion resistance and the like.

Patent Document 4 discloses a hot press member, having a steel structure in which the surface layer portion is a soft layer, the inside portion is a hard layer, and the transition layer is between the soft layer and the hard layer, and the soft layer has a ferrite with a volume fraction of 90% or more with respect to the entire soft layer, is disclosed.

However, in order to obtain a higher vehicle body weight reduction effect, superior strength and hydrogen embrittlement resistance are required.

PRIOR ART DOCUMENT

Patent Document

[Patent Document 1] PCT International Publication No. WO2016/132545
[Patent Document 2] Japanese Unexamined Patent Application, First Publication No. 2012-172203
[Patent Document 3] Japanese Patent No. 5861766
[Patent Document 4] Japanese Patent No. 6428970

DISCLOSURE OF THE INVENTION

Problems to be Solved by the Invention

In view of the problems of the related art, an object of the present invention is to provide a hot-stamping formed body excellent in strength and hydrogen embrittlement resistance.

Means for Solving the Problem

As a result of intensive examinations on a method for solving the above problems, the present inventors have obtained the following findings.

The present inventors found that the stress relaxation ability of grain boundaries can be increased by, in a surface layer region which is a region from the surface of a steel sheet forming a hot-stamping formed body to a position at a depth of 50 μm from the surface, setting the average grain size of prior austenite grains to 10.0 μm or less and setting the Ni concentration per unit area at grain boundaries having an average crystal orientation difference of 15° or more to 1.5 mass %/μm$^2$ or more, whereby a hot-stamping formed body having better hydrogen embrittlement resistance than in the related art is obtained.

The present invention has been made by conducting further examinations based on the above findings, and the gist thereof is as follows.

(1) A hot-stamping formed body according to an aspect of the present invention includes: a steel sheet containing, as a chemical composition, by mass %, C: 0.15% or more and less than 0.70%,
Si: 0.005% to 0.250%,
Mn: 0.30% to 3.00%,
sol. Al: 0.0002% to 0.500%,
P: 0.100% or less,
S: 0.1000% or less,
N: 0.0100% or less,
Nb: 0% to 0.150%,
Ti: 0% to 0.150%,
Mo: 0% to 1.000%,
Cr: 0% to 1.000%,
B: 0% to 0.0100%,
Ca: 0% to 0.010%,
REM: 0% to 0.30%, and
a remainder consisting of Fe and impurities; and
a plating layer provided on a surface of the steel sheet, the plating layer having an adhesion amount of 10 g/m$^2$ to 90 g/m$^2$ and a Ni content of 10 mass % to 25 mass %, and containing a remainder consisting of Zn and impurities,
in which, in a surface layer region, which is a region from the surface of the steel sheet to a position at a depth of 50 μm from the surface, an average grain size of prior austenite grains to 10.0 μm or less, and a Ni concentration per unit area at grain boundaries having an average crystal orientation difference of 15° or more is 1.5 mass %/μm² or more.

(2) The hot-stamping formed body according to (1), may include, as the chemical composition, by mass %, one or two or more selected from the group consisting of:

Nb: 0.010% to 0.150%;
Ti: 0.010% to 0.150%;
Mo: 0.005% to 1.000%;
Cr: 0.005% to 1.000%;
B: 0.0005% to 0.0100%;
Ca: 0.0005% to 0.010%; and
REM: 0.0005% to 0.30%.

Effects of the Invention

According to the present invention, it is possible to provide a hot-stamping formed body having high strength and having better hydrogen embrittlement resistance than in the related art is obtained.

EMBODIMENTS OF THE INVENTION

Figure 1:
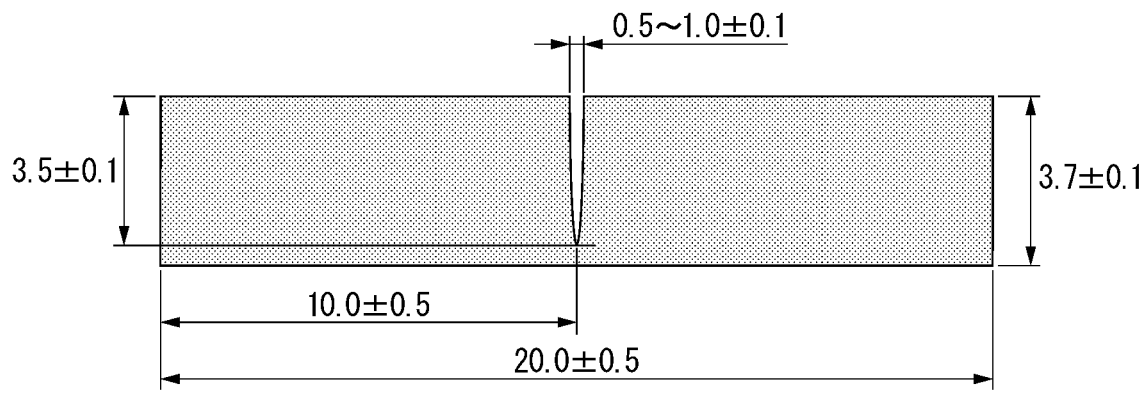
FIG. 1 is a diagram showing a test piece used for measuring a Ni concentration per unit area at a grain boundary having an average crystal orientation difference of 15° or more.

A feature of a hot-stamping formed body according to the present embodiment are as follows.

The hot-stamping formed body according to the present embodiment is characterized in that, in a surface layer region, which is a region from the surface of a steel sheet forming the hot-stamping formed body to a position at a depth of 50 μm from the surface, the average grain size of prior austenite grains is set to 10.0 μm or less and the Ni concentration per unit area at grain boundaries having an average crystal orientation difference of 15° or more is set to 1.5 mass %/μm² or more, whereby the stress relaxation ability of grain boundaries is increased.

As a result of intensive examinations, the present inventors found that the above structure are obtained by the following method.

As a first stage, in a hot rolling step, rough rolling is performed in a temperature range of 1,050° C. or higher with a cumulative rolling reduction of 40% or more to promote recrystallization of austenite. Next, a small amount of dislocations are introduced into the austenite after the completion of recrystallization by performing finish rolling with a final rolling reduction of 5% or more and less than 20% in a temperature range of an $A_3$ point or higher. After the finish rolling is ended, cooling is started within 0.5 seconds, and the average cooling rate down to a temperature range of 650° C. or lower is set to 30° C./s or faster. Accordingly, while maintaining the dislocations introduced into the austenite, transformation from the austenite to bainitic ferrite can be started.

Next, austenite is transformed into bainitic ferrite in a temperature range of 550° C. or higher and lower than 650° C. In this temperature range, the transformation into bainitic ferrite tends to be delayed, and in a steel sheet containing 0.15 mass % or more of C, the transformation rate into bainitic ferrite generally becomes slow, and it is difficult to obtain a desired amount of bainitic ferrite. In the present embodiment, in a rolling step, dislocations (strain) are introduced into the surface layer of the steel sheet, and transformation from the austenite into which the dislocations are introduced is caused. Accordingly, the transformation into bainitic ferrite is promoted, and a desired amount of bainitic ferrite can be obtained in the surface layer region of the steel sheet.

In a temperature range of 550° C. or higher and lower than 650° C., slow cooling at an average cooling rate of 1° C./s or faster and slower than 10° C./s is performed to promote the transformation of austenite into bainitic ferrite, whereby the average crystal orientation difference of the grain boundaries of bainitic ferrite can be controlled to 0.4° to 3.0°. Initial bainitic ferrite has grain boundaries having an average crystal orientation difference of 5° or more. However, by performing slow cooling in a temperature range (a temperature range of 550° C. or higher and lower than 650° C.) in which Fe is diffusible, the recovery of dislocations occurs in the vicinity of the grain boundaries of bainitic ferrite, and subgrain boundaries having an average crystal orientation difference of 0.4° to 3.0° are generated. In this case, C in the steel diffuses into the surrounding high angle grain boundaries instead of subgrain boundaries, so that the amount of C segregated in the subgrain boundaries decreases.

Next, by performing cooling in a temperature range of 550° C. or lower at an average cooling rate of 40° C./s or faster, the diffusion of C contained in bainitic ferrite into the subgrain boundaries is suppressed.

As a second stage, a Zn-based plating layer containing 10 to 25 mass % of Ni is formed so that the adhesion amount thereof is 10 to 90 g/m², whereby a steel sheet for hot stamping is obtained.

As a third stage, by controlling the temperature rising rate during hot-stamping heating, the subgrain boundaries having an average crystal orientation difference of 0.4° to 3.0° promote the diffusion of Ni, so that Ni can be contained in the grains of the surface layer of the steel sheet.

In a case of controlling the average heating rate in the hot-stamping forming step to 100° C./s or faster and slower than 200° C./s, Ni contained in the plating layer diffuses into the steel sheet through the subgrain boundaries of the surface layer of the steel sheet as paths, and Ni segregates to the grain boundaries as it is. This is because the heating rate is so fast that diffusion from the grain boundaries into the grains.

When the heating temperature reaches the $A_3$ point or higher, the reverse transformation into austenite is completed. However, since the heating rate is fast, transformation from austenite into lower bainite, martensite, or tempered martensite occurs while Ni is segregated to the prior subgrain boundaries. Since Ni is an austenite stabilizing element, phase transformation from a region where Ni is concentrated is unlikely to occur, and Ni segregation sites remain as packet boundaries or block boundaries of lower bainite, martensite, or tempered martensite. As a result, in the surface layer region of the steel sheet, the average grain size of the prior austenite grains can be controlled to 10.0 μm or less, and the Ni concentration per unit area at the grain boundaries having an average crystal orientation difference of 15° or more can be controlled to 1.5 mass %/μm² or more. Ni has an effect of increasing the mobility of dislocations by lowering the Peierls potential and thus has a high intergranular stress relaxation ability, thereby suppressing brittle fracture from the grain boundaries even though hydrogen infiltrated into the steel is accumulated at the grain boundaries.

As a result, the hydrogen embrittlement resistance of the hot-stamping formed body is improved.

Hereinafter, the hot-stamping formed body according to the present embodiment and a method of manufacturing the same will be described in detail. First, the reason for limiting the chemical composition of the steel sheet forming the hot-stamping formed body according to the present embodiment will be described. Furthermore, the numerical limit range described below includes a lower limit and an upper limit in the range. Numerical values indicated as "less than" or "more than" do not fall within the numerical range. In addition, all % regarding the chemical composition means mass %.

The steel sheet forming the hot-stamping formed body according to the present embodiment contains, as the chemical composition, by mass %, C: 0.15% or more and less than 0.70%, Si: 0.005% to 0.250%, Mn: 0.30% to 3.00%, sol. Al: 0.0002% to 0.500%, P: 0.100% or less, S: 0.1000% or less, N: 0.0100% or less, and a remainder: Fe and impurities.

"C: 0.15% or More and Less than 0.70%"

C is an important element for obtaining a tensile strength of 1,500 MPa or more in the hot-stamping formed body. When the C content is less than 0.15%, martensite is soft and it is difficult to secure a tensile strength of 1,500 MPa or more. Therefore, the C content is set to 0.15% or more. The C content is preferably 0.18% or more, 0.19% or more, more than 0.20%, 0.23% or more, or 0.25% or more. On the other hand, when the C content is 0.70% or more, coarse carbides are generated and fracture is likely to occur, resulting in a decrease in the hydrogen embrittlement resistance of the hot-stamping formed body. For this reason, the C content is set to less than 0.70%. The C content is preferably 0.50% or less, 0.45% or less, or 0.40% or less.

"Si: 0.005% to 0.250%"

Si is an element that promotes the phase transformation from austenite into bainitic ferrite. When the Si content is less than 0.005%, the above effect cannot be obtained, and a desired metallographic structure cannot be obtained in the surface layer region of the steel sheet for hot stamping. As a result, a desired microstructure cannot be obtained in the hot-stamping formed body. Therefore, the Si content is set to 0.005% or more. The Si content is preferably 0.010% or more, 0.050% or more, or 0.100% or more. On the other hand, even if Si is contained in an amount of more than 0.250%, the above effect is saturated. Therefore, the Si content is set to 0.250% or less. The Si content is preferably 0.230% or less, or 0.200% or less.

"Mn: 0.30% to 3.00%"

Mn is an element that contributes to an improvement in the strength of the hot-stamping formed body by solid solution strengthening. When the Mn content is less than 0.30%, the solid solution strengthening ability is insufficient and martensite becomes soft, so that it is difficult to obtain a tensile strength of 1,500 MPa or more in the hot-stamping formed body. Therefore, the Mn content is set to 0.30% or more. The Mn content is preferably 0.70% or more, 0.75% or more, or 0.80% or more. On the other hand, when the Mn content exceeds 3.00%, coarse inclusions are generated in the steel and fracture is likely to occur, resulting in a decrease in the hydrogen embrittlement resistance of the hot-stamping formed body. Therefore, the Mn content is set to 3.00% or less. The Mn content is preferably 2.50% or less, 2.00% or less, and 1.50% or less.

"P: 0.100% or Less"

P is an element that segregates to the grain boundaries and reduces intergranular strength. When the P content exceeds 0.100%, the intergranular strength significantly decreases, and the hydrogen embrittlement resistance of the hot-stamping formed body decreases. Therefore, the P content is set to 0.100% or less. The P content is preferably 0.050% or less, and 0.020% or less. The lower limit of the P content is not particularly limited. However, when the P content is reduced to less than 0.0001%, the dephosphorization cost is increased significantly, which is economically unfavorable. In an actual operation, the P content may be set to 0.0001% or more.

"S: 0.1000% or Less"

S is an element that forms inclusions in the steel. When the S content exceeds 0.1000%, a large amount of inclusions are generated in the steel, and the hydrogen embrittlement resistance of the hot-stamping formed body decreases. Therefore, the S content is set to 0.1000% or less. The S content is preferably 0.0050% or less, 0.0030% or less, or 0.0020% or less. The lower limit of the S content is not particularly limited. However, when the S content is reduced to less than 0.00015%, the desulfurization cost is increased significantly, which is economically unfavorable. In an actual operation, the S content may be set to 0.00015% or more.

"Sol. Al: 0.0002% to 0.500%"

Al is an element having an action of deoxidizing molten steel and achieving soundness of the steel (suppressing the occurrence of defects such as blowholes in the steel). When the sol. Al content is less than 0.0002%, deoxidation does not sufficiently proceed. Therefore, the sol. Al content is set to 0.0002% or more. The sol. Al content is preferably 0.0010% or more. On the other hand, when the sol. Al content exceeds 0.500%, coarse oxides are generated in the steel, and the hydrogen embrittlement resistance of the hot-stamping formed body decreases. Therefore, the sol. Al content is set to 0.500% or less. The sol. Al content is preferably 0.400% or less, 0.200% or less, and 0.100% or less.

"N: 0.0100% or Less"

N is an impurity element that forms nitrides in the steel and is an element that deteriorates the hydrogen embrittlement resistance of the hot-stamping formed body. When the N content exceeds 0.0100%, coarse nitrides are generated in the steel, the hydrogen embrittlement resistance of the hot-stamping formed body significantly decreases. Therefore, the N content is set to 0.0100% or less. The N content is preferably 0.0075% or less, and 0.0060% or less. The lower limit of the N content is not particularly limited. However, when the N content is reduced to less than 0.0001%, the denitrification cost is increased significantly, which is economically unfavorable. In an actual operation, the N content may be set to 0.0001% or more.

The remainder of the chemical composition of the steel sheet forming the hot-stamping formed body according to the present embodiment consists of Fe and impurities. Examples of the impurities include elements that are unavoidably incorporated from steel raw materials or scrap and/or in a steelmaking process and are allowed in a range in which the characteristics of the hot-stamping formed body according to the present embodiment are not inhibited.

The steel sheet forming the hot-stamping formed body according to the present embodiment contains substantially no Ni, and the Ni content is less than 0.005%. Since Ni is an expensive element, in the present embodiment, the cost can be kept low compared to a case where Ni is intentionally contained to set the Ni content to 0.005% or more.

The steel sheet forming the hot-stamping formed body according to the present embodiment may contain the following elements as optional elements instead of a portion of Fe. In a case where the following optional elements are not contained, the amount thereof is 0%.

"Nb: 0% to 0.150%"

Nb is an element that contributes to an improvement in the strength of the hot-stamping formed body by solid solution strengthening and thus may be contained as necessary. In a case where Nb is contained, the Nb content is preferably set to 0.010% or more in order to reliably exhibit the above effect. The Nb content is more preferably 0.035% or more. On the other hand, even if Nb is contained in an amount of more than 0.150%, the above effect is saturated. Therefore, the Nb content is preferably set to 0.150% or less. The Nb content is more preferably 0.120% or less.

"Ti: 0% to 0.150%"

Ti is an element that contributes to an improvement in the strength of the hot-stamping formed body by solid solution strengthening and thus may be contained as necessary. In a case where Ti is contained, the Ti content is preferably set to 0.010% or more in order to reliably exhibit the above effect. The Ti content is preferably 0.020% or more. On the other hand, even if Ti is contained in an amount of more than 0.150%, the above effect is saturated. Therefore, the Ti content is preferably set to 0.150% or less. The Ti content is more preferably 0.120% or less.

"Mo: 0% to 1.000%"

Mo is an element that contributes to an improvement in the strength of the hot-stamping formed body by solid solution strengthening and thus may be contained as necessary. In a case where Mo is contained, the Mo content is preferably set to 0.005% or more in order to reliably exhibit the above effect. The Mo content is more preferably 0.010% or more. On the other hand, even if Mo is contained in an amount of more than 1.000%, the above effect is saturated. Therefore, the Mo content is preferably set to 1.000% or less. The Mo content is more preferably 0.800% or less.

"Cr: 0% to 1.000%"

Cr is an element that contributes to an improvement in the strength of the hot-stamping formed body by solid solution strengthening and thus may be contained as necessary. In a case where Cr is contained, the Cr content is preferably set to 0.005% or more in order to reliably exhibit the above effect. The Cr content is more preferably 0.100% or more. On the other hand, even if Cr is contained in an amount of more than 1.000%, the above effect is saturated. Therefore, the Cr content is preferably set to 1.000% or less. The Cr content is more preferably 0.800% or less.

"B: 0% or More and 0.0100% or less"

B is an element that segregates to improve the grain boundaries and reduces the intergranular strength, so that B may be contained as necessary. In a case where B is contained, the B content is preferably set to 0.0005% or more in order to reliably exhibit the above effect. The B content is preferably 0.0010% or more. On the other hand, even if B is contained in an amount of more than 0.0100%, the above effect is saturated. Therefore, the B content is preferably set to 0.0100% or less. The B content is more preferably 0.0075% or less.

"Ca: 0% to 0.010%"

Ca is an element having an action of deoxidizing molten steel and achieving soundness of the steel. In order to reliably exhibit this action, the Ca content is preferably set to 0.0005% or more. On the other hand, even if Ca is contained in an amount of more than 0.010%, the above effect is saturated. Therefore, the Ca content is preferably set to 0.010% or less.

"REM: 0% to 0.30%"

REM is an element having an action of deoxidizing molten steel and achieving soundness of the steel. In order to reliably exhibit this effect, the REM content is preferably set to 0.0005% or more. On the other hand, even if REM is contained in an amount of more than 0.30%, the above effect is saturated. Therefore, the REM content is preferably set to 0.30% or less.

In the present embodiment, REM refers to a total of 17 elements including Sc, Y, and lanthanoids. In the present embodiment, the REM content refers to the total amount of these elements.

The chemical composition of the steel sheet for hot stamping described above may be measured by a general analytical method. For example, the chemical composition may be measured using inductively coupled plasma-atomic emission spectrometry (ICP-AES). C and S may be measured using a combustion-infrared absorption method, and N may be measured using an inert gas fusion-thermal conductivity method. sol. Al may be measured by ICP-AES using a filtrate obtained by heating and decomposing a sample with an acid. In a case where the steel sheet for hot stamping includes a plating layer on the surface, the chemical composition may be analyzed after removing the plating layer on the surface by mechanical grinding.

Next, the microstructure of the steel sheet forming the hot-stamping formed body according to the present embodiment and the microstructure of the steel sheet forming the steel sheet for hot stamping applied thereto will be described.

<Steel Sheet for Hot Stamping>

"In Surface Layer Region, Which is Region from Surface of Steel Sheet to Position at Depth of 50 μm from Surface, 80% or More by area % of Grains Having Average Crystal Orientation Difference of 0.4° to 3.0° Are Included Inside Grains Surrounded by Grain Boundaries Having Average Crystal Orientation Difference of 5° or More"

In the surface layer region of the steel sheet, 80% or more by area % of grains having an average crystal orientation difference of 0.4° to 3.0° are included inside grains surrounded by grain boundaries having an average crystal orientation difference of 5° or more, whereby the subgrain boundaries having an average crystal orientation difference of 0.4° to 3.0° promote the diffusion of Ni during hot-stamping heating, and Ni can be contained in the grains of the surface layer of the steel sheet. As described above, in a method of generating ferrite in the surface layer of a steel sheet in the related art, subgrain boundaries are not formed, so that it is difficult to promote the diffusion of Ni. However, in the steel sheet for hot stamping applied to the hot-stamping formed body according to the present embodiment, since the grains are contained in the surface layer region in 80% or more by area %, Ni can be diffused into the surface layer of the steel sheet by using the subgrain boundaries as diffusion paths of Ni.

In a case of controlling the average heating rate in the hot-stamping forming step to 100° C./s or faster and slower than 200° C./s, Ni in the plating layer diffuses into the steel sheet through the subgrain boundaries of the surface layer of the steel sheet as paths, and Ni segregates to the grain boundaries as it is. Ni segregation sites remain as grain boundaries of lower bainite, martensite, or tempered martensite. Accordingly, the hydrogen embrittlement resistance of the hot-stamping formed body can be improved.

In order to obtain the above effect, in the surface layer region of the steel sheet, the grains having an average crystal orientation difference of 0.4° to 3.0° need to be included in 80% or more by area % inside the grains surrounded by the grain boundaries having an average crystal orientation difference of 5° or more. Therefore, in the surface layer region of the steel sheet, the grains having an average crystal orientation difference of 0.4° to 3.0° are included in 80% or more by area % inside the grains surrounded by the grain boundaries having an average crystal orientation difference of 5° or more. The grains having an average crystal orientation difference of 0.4° to 3.0° are included in preferably 85% or more, and more preferably 90% or more.

The microstructure of the center portion of the steel sheet is not particularly limited, but is generally one or more of ferrite, upper bainite, lower bainite, martensite, tempered martensite, residual austenite, iron carbides, and alloy carbides.

The structure can be observed by a general method using a field-emission scanning electron microscope (FE-SEM), an electron back scattering diffraction (EBSD) method, or the like.

Next, a method of measuring the area fraction of the grains having an average crystal orientation difference of 0.4° to 3.0° inside the grains surrounded by the grain boundaries having an average crystal orientation difference of 5° or more will be described.

First, a sample is cut out so that a cross section perpendicular to the surface (sheet thickness cross section) can be observed. The size of the sample depends on a measuring apparatus, but may be set so that a size of about 10 mm can be observed in a rolling direction. The cross section of the sample is polished using #600 to #1500 silicon carbide paper and thereafter mirror-finished using a liquid obtained by dispersing a diamond powder having a particle size of 1 to 6 μm in a diluted solution such as alcohol or pure water. Next, the cross section of the sample is polished at room temperature using colloidal silica containing no alkaline solution for 8 minutes to remove strain introduced into the surface layer of the sample.

At any position in the longitudinal direction of the cross section of the sample, a region having a length of 50 μm from the surface of the steel sheet (the interface between the plating layer and the steel sheet) to a position at a depth of 50 μm from the surface of the steel sheet is measured by an electron back scattering diffraction method at a measurement interval of 0.2 μm to obtain crystal orientation information. For the measurement, an apparatus including a thermal field-emission scanning electron microscope (JSM-7001F manufactured by JEOL Ltd.) and an EBSD detector (DVCS type detector manufactured by TSL) is used. At this time, the degree of vacuum in the apparatus is set to $9.6 \times 10^{-5}$ Pa or less, the acceleration voltage is set to 15 kV, the irradiation current level is set to 13, and the electron beam irradiation time is set to 0.5 sec/point. The obtained crystal orientation information is analyzed using the "Grain Average Misorientation" function installed in the software "OIM Analysis (registered trademark)" attached to the EBSD analyzer. With this function, it is possible to calculate the crystal orientation difference between adjacent measurement points for the grains having a body-centered cubic structure and thereafter obtain the average value (average crystal orientation difference) for all the measurement points in the grains. Regarding the area fraction of the grains having an average crystal orientation difference of 0.4° to 3.0° inside the grains surrounded by the grain boundaries having an average crystal orientation difference of 5° or more, in the obtained crystal orientation information, a region surrounded by grain boundaries having an average crystal orientation difference of 5° or more is defined as a grain, and the area fraction of a region in which the average crystal orientation difference in the grains is 0.4° to 3.0° is calculated by the "Grain Average Misorientation" function. Accordingly, in the surface layer region, the area fraction of the grains having an average crystal orientation difference of 0.4° to 3.0° inside the grains surrounded by the grain boundaries having an average crystal orientation difference of 5° or more is obtained.

"Plating Layer Having Adhesion Amount of 10 g/m² to 90 g/m² and Ni Content of 10 Mass % to 25 Mass % and Containing Remainder Consisting of Zn and Impurities"

The steel sheet for hot stamping applied to the hot-stamping formed body according to the present embodiment has the plating layer having an adhesion amount of 10 g/m² to 90 g/m² and a Ni content of 10 mass % to 25 mass % and containing a remainder consisting of Zn and impurities on the surface of the steel sheet. Accordingly, at the time of hot stamping, the subgrain boundaries having an average crystal orientation difference of 0.4° to 3.0° promote the diffusion of Ni, and Ni can be contained in the grains in the surface layer region of the steel sheet forming the hot-stamping formed body.

When the adhesion amount is less than 10 g/m² or the Ni content in the plating layer is less than 10 mass %, in the surface layer region of the steel sheet, the Ni content per unit area at the grain boundaries having an average crystal orientation difference of 15° or more cannot be 1.5 mass %/μm² or more, and the hydrogen embrittlement resistance of the hot-stamping formed body cannot be improved.

On the other hand, in a case where the adhesion amount exceeds 90 g/m², or in a case where the Ni content in the plating layer exceeds 25 mass %, Ni is excessively concentrated at the interface between the plating layer and the steel sheet, the adhesion between the plating layer and the steel sheet decreases, and it becomes difficult to supply Ni in the plating layer to the surface layer of the steel sheet, so that a desired microstructure for the hot-stamping formed body after hot stamping cannot be obtained. The adhesion amount of the plating layer is preferably 30 g/m² or more, or 40 g/m² or more. The adhesion amount of the plating layer is preferably 70 g/m² or less, or 60 g/m² or less. The Ni content in the plating layer is preferably 12 mass % or more, or 14 mass % or more. The Ni content in the plating layer is preferably 20 mass % or less, or 18 mass % or less.

The plating adhesion amount and the Ni content in the plating layer are measured by the following methods.

The plating adhesion amount is measured with a test piece collected from any position of the steel sheet for hot stamping according to the test method described in JIS H 0401: 2013. Regarding the Ni content in the plating layer, a test piece is collected from any position of the steel sheet for hot stamping according to the test method described in JIS K 0150:2009, and the Ni content at a ½ position of the overall thickness of the plating layer is measured. The obtained Ni content is defined as the Ni content of the plating layer in the steel sheet for hot stamping.

The sheet thickness of the steel sheet for hot stamping is not particularly limited, but is preferably 0.5 to 3.5 mm from the viewpoint of a reduction in the weight of the vehicle body.

Next, a hot-stamping formed body according to the present embodiment manufactured by using the above-described steel sheet for hot stamping will be described.

"In Surface Layer Region, which is Region from Surface of Steel Sheet to Position at Depth of 50 μm from Surface, Average Grain Size of Prior Austenite Grains is 10.0 μm or Less"

In the surface layer region of the steel sheet forming the hot-stamping formed body, when the average grain size of prior austenite grains is 10.0 μm or less, good hydrogen embrittlement resistance can be obtained in the hot-stamping formed body. When hydrogen infiltrates into the steel and stress is applied to the material, intergranular fracture is promoted. At this time, in a case where the average grain size of the prior austenite grains is fine, the propagation of cracks can be suppressed. Therefore, the average grain size of the prior austenite grains in the surface layer region of the steel sheet is set to 10.0 μm or less. The average grain size of the prior austenite grains in the surface layer region is preferably 8.0 μm or less, 7.0 μm or less, 6.5 μm or less, or 6.0 μm or less. From the viewpoint of suppressing the propagation of cracks, the smaller the average grain size of the prior austenite grains is, the more preferable it is, and the lower limit thereof is not particularly determined. However, in a current actual operation, it is difficult to set the average grain size of the prior austenite grains to 0.5 μm or less, so that the substantial lower limit thereof is 0.5 μm. Therefore, the average grain size of the prior austenite grains may be set to 0.5 μm or more, 1.0 μm or more, 3.0 μm or more, or 4.0 μm or more.

"Method of Measuring Average Grain Size of Prior Austenite Grains"

The average grain size of the prior austenite grains is measured as follows.

First, the hot-stamping formed body is subjected to a heat treatment at 540° C. for 24 hours. This promotes corrosion of the prior austenite grain boundaries. As the heat treatment, furnace heating or energization heating may be performed, the temperature rising rate is set to 0.1 to 100° C./s, and the cooling rate is set to 0.1 to 150° C./s. A cross section perpendicular to the sheet surface is cut out from a center portion (a portion avoiding end portions) of the hot-stamping formed body after the heat treatment, and the cross section is polished using #600 to #1500 silicon carbide paper to be used as an observed section. Thereafter, the observed section is mirror-finished using a liquid obtained by dispersing a diamond powder having a particle size of 1 to 6 μm in a diluted solution such as alcohol or pure water.

Next, the observed section is immersed in a 3% to 4% sulfuric acid-alcohol (or water) solution for 1 minute to reveal the prior austenite grain boundaries. At this time, the corrosion work is performed in an exhaust treatment apparatus, and the temperature of the work atmosphere is room temperature. The corroded sample is washed with acetone or ethyl alcohol, then dried, and subjected to scanning electron microscopy. The scanning electron microscope used is equipped with a secondary electron detector. In a vacuum of $9.6 \times 10^{-5}$ Pa or less, the sample is irradiated with an electron beam at an acceleration voltage of 15 kV and an irradiation current level of 13, and a secondary electron image of a range from the surface of the steel sheet (the interface between the plating layer and the steel sheet) to a position at a depth of 50 μm from the surface of the steel sheet is photographed. The photographing magnification is set to 4,000-fold based on a screen of 386 mm in width×290 mm in length, and the number of photographed visual fields is set to 10 or more visual fields. In the photographed secondary electron image, the prior austenite grain boundaries are imaged as a bright contrast. For one of the prior austenite grains included in the observed visual field, the average value of the shortest diameter and the longest diameter is calculated, and the average value is used as the grain size of the prior austenite grains. The above operation is performed on all the prior austenite grains except for the prior austenite grains which are not entirely included in the photographed visual fields, such as grains in the end portion of the photographed visual field, and the grain sizes of all the prior austenite grains in the photographed visual fields are obtained. The average grain size of the prior austenite grains in the photographed visual fields is obtained by calculating a value obtained by dividing the sum of the obtained grain sizes of the prior austenite grains by the total number of prior austenite grains of which grain sizes are measured. This operation is performed on all the photographed visual fields, and the average grain size of the prior austenite grains of all the photographed visual fields is calculated, thereby obtaining the average grain size of the prior austenite grains in the surface layer region.

"In Surface Layer Region, which is Region from Surface of Steel Sheet to Position at Depth of 50 μm from Surface, Ni Concentration Per Unit Area at Grain Boundaries Having Average Crystal Orientation Difference of 15° or More is 1.5 Mass %/μm² or More"

In the surface layer region of the steel sheet, when the Ni concentration per unit area at the grain boundaries having an average crystal orientation difference of 15° or more is 1.5 mass %/μm² or more, good hydrogen embrittlement resistance can be obtained in the hot-stamping formed body. The Ni concentration is preferably 1.8 mass %/μm² or more, and more preferably 2.0 mass %/μm² or more. The above effect is sufficiently obtained as the Ni concentration increases. However, in a current actual operation, it is difficult to set the Ni concentration to 10.0 mass %/μm² or more, so that the substantial upper limit thereof is 10.0 mass %/μm². Therefore, the Ni concentration may be set to 10.0 mass %/μm² or less, 5.0 mass %/μm² or less, or 3.0 mass %/μm² or less.

"Method of Measuring Ni Concentration"

Next, a method of measuring the Ni concentration per unit area at grain boundaries having an average crystal orientation difference of 15° or more will be described.

A test piece having the dimensions shown in FIG. 1 is produced from the center portion (a portion avoiding the end portion) of the hot-stamping formed body after the heat treatment performed when measuring the average grain size of the prior austenite grains. A notch in the center portion of the test piece is inserted by a wire cutter having a thickness of 1 mm, and the joint at the bottom of the notch is controlled to 100 to 200 μm. Next, the test piece is immersed in a 20%-ammonium thiocyanate solution for 24 to 48 hours. The front and rear surfaces of the test piece are galvanized within 0.5 hours after the immersion is completed. After the galvanizing, the test piece is subjected to Auger electron emission spectroscopy within 1.5 hours. The kind of apparatus for performing the Auger electron emission spectroscopy is not particularly limited. The test piece is set in an analyzer, and in a vacuum of $9.6 \times 10^{-5}$ Pa or less, and the test piece is fractured from the notch portion to expose the grain boundaries having an average crystal orientation difference of 15° or more. The exposed grain boundaries having an average crystal orientation difference of 15° or more are irradiated with an electron beam at an acceleration voltage of 1 to 30 kV, and the mass % (concentration) of Ni at the grain boundaries is measured. The measurement is performed for 10 or more grain boundaries having an average crystal orientation difference of 15° or more. The measurement is completed within 30 minutes after the fracture to prevent contamination of the grain boundaries. By calculating the average value of the obtained mass % (concentrations) of Ni and calculating the Ni concentration per unit area, the Ni concentration per unit area at the grain boundaries having an average crystal orientation difference of 15° or more is obtained.

In the hot-stamping formed body according to the present embodiment, the metallographic structure of the surface layer region may be 85% or more of martensite. In addition, the remainder in the microstructure is one or more of residual austenite, ferrite, pearlite, granular bainite, and upper bainite.

The area fractions of martensite and the remainder in the microstructure are measured by the following methods.

A sample is cut out from a position 50 mm or more away from the end surface of the hot-stamping formed body so that a cross section (sheet thickness cross section) perpendicular to the surface can be observed. The size of the sample depends on a measuring apparatus, but may be set so that a size of about 10 mm can be observed in a rolling direction.

In a case where a sample cannot be collected from a position 50 mm or more away from the end surface of the hot-stamping formed body because of the shape of the hot-stamping formed body, a sample is collected from a position as far away from the end surface as possible.

The cross section of the sample is polished using #600 to #1500 silicon carbide paper, thereafter mirror-finished using a liquid obtained by dispersing a diamond powder having a particle size of 1 to 6 μm in a diluted solution such as alcohol or pure water, and subjected to nital etching. Next, in the observed section, a region from the surface of the steel sheet (the interface between the plating layer and the steel sheet) to a position at a depth of 50 μm from the surface of the steel sheet is measured as an observed visual field using a thermal field-emission scanning electron microscope (JSM-7001F manufactured by JEOL Ltd.).

Martensite is not sufficiently etched by nital etching and is therefore distinguishable from other etched structures. However, since residual austenite is not sufficiently etched like martensite, the area % of martensite is obtained by obtaining the difference from the area % of residual austenite obtained by a method described later.

The area fraction of the remainder in the microstructure is obtained by calculating a value obtained by subtracting the area fraction of the sum of martensite, tempered martensite, and lower bainite from 100%.

The cross section of the sample is polished using #600 to #1500 silicon carbide paper and thereafter mirror-finished using a liquid obtained by dispersing a diamond powder having a particle size of 1 to 6 μm in a diluted solution such as alcohol or pure water. Next, the cross section of the sample is polished at room temperature using colloidal silica containing no alkaline solution for 8 minutes to remove strain introduced into the surface layer of the sample. At any position in the longitudinal direction of the cross section of the sample, a region having a length of 50 μm from the surface of the steel sheet (the interface between the plating layer and the steel sheet) to a position at a depth of 50 μm from the surface of the steel sheet is measured by an electron back scattering diffraction method at a measurement interval of 0.1 μm to obtain crystal orientation information. For the measurement, an apparatus including a thermal field-emission scanning electron microscope (JSM-7001F manufactured by JEOL Ltd.) and an EBSD detector (DVCS type detector manufactured by TSL) is used. At this time, the degree of vacuum in the apparatus is set to $9.6 \times 10^{-5}$ Pa or less, the acceleration voltage is set to 15 kV, the irradiation current level is set to 13, and the electron beam irradiation time is set to 0.01 sec/point. The area % of residual austenite, which is an fcc structure, is calculated from the obtained crystal orientation information using the "Phase Map" function installed in the software "OIM Analysis (registered trademark)" attached to the EBSD analyzer, thereby obtaining the area % of residual austenite in the surface layer region.

"Plating Layer Having Adhesion Amount of 10 $g/m^2$ to 90 $g/m^2$ and Ni Content of 10 Mass % to 25 Mass % and Containing Remainder Consisting of Zn and Impurities"

The hot-stamping formed body according to the present embodiment has a plating layer having an adhesion amount of 10 $g/m^2$ to 90 $g/m^2$ and a Ni content of 10 mass % to 25 mass % and containing a remainder consisting of Zn and impurities on the surface of the steel sheet.

When the adhesion amount is less than 10 $g/m^2$ or the Ni content in the plating layer is less than 10 mass %, the amount of Ni concentrated in the surface layer region of the steel sheet is small, and a desired metallographic structure cannot be obtained in the surface layer region after hot stamping. On the other hand, in a case where the adhesion amount exceeds 90 $g/m^2$, or in a case where the Ni content in the plating layer exceeds 25 mass %, Ni is excessively concentrated at the interface between the plating layer and the steel sheet, the adhesion between the plating layer and the steel sheet decreases, and Ni in the plating layer is less likely to diffuse into the surface layer region of the steel sheet, so that a desired metallographic structure cannot be obtained in the hot-stamping formed body.

The adhesion amount of the plating layer is preferably 30 $g/m^2$ or more, or 40 $g/m^2$ or more. The adhesion amount of the plating layer is preferably 70 $g/m^2$ or less, or 60 $g/m^2$ or less. The Ni content in the plating layer is preferably 12 mass % or more, or 14 mass % or more. The Ni content in the plating layer is preferably 20 mass % or less, or 18 mass % or less.

The plating adhesion amount of the hot-stamping formed body and the Ni content in the plating layer are measured by the following methods.

The plating adhesion amount is measured with a test piece collected from any position of the hot-stamping formed body according to the test method described in JIS H 0401:2013. Regarding the Ni content in the plating layer, a test piece is collected from any position of the hot-stamping formed body according to the test method described in JIS K 0150:2009, and the Ni content at a ½ position of the overall thickness of the plating layer is measured, thereby obtaining the Ni content of the plating layer in the hot-stamping formed body.

Next, a preferred manufacturing method of the hot-stamping formed body according to the present embodiment. First, a manufacturing method of the steel sheet for hot stamping applied to the hot-stamping formed body according to the present embodiment will be described.

<Method of Manufacturing Steel Sheet for Hot Stamping>
"Rough Rolling"

A steel piece (steel) to be subjected to hot rolling may be a steel piece manufactured by an ordinary method, and may be, for example, a steel piece manufactured by a general method such as a continuously cast slab or a thin slab caster. It is preferable that the steel having the above-described chemical composition is subjected to hot rolling, and in a hot rolling step, subjected to rough rolling with a cumulative rolling reduction of 40% or more in a temperature range of 1,050° C. or higher. In a case where the rolling is performed at a temperature of lower than 1,050° C. or in a case where the rough rolling is ended at a cumulative rolling reduction of less than 40%, recrystallization of austenite is not promoted, and transformation into bainitic ferrite occurs while excessive dislocations are included in the subsequent step, so that in the surface layer region of the steel sheet for hot stamping, the ratio of grains having an average crystal orientation difference of 0.4° to 3.0° inside grains surrounded by grain boundaries having an average crystal orientation difference of 5° or more cannot be 80% or more by area %.

"Finish Rolling"

Next, it is preferable to perform finish rolling with a final rolling reduction of 5% or more and less than 20% in a temperature range of an $A_3$ point or higher. In a case where rolling is performed at a temperature lower than the $A_3$ point, or in a case where the finish rolling is ended at a final rolling reduction of 20% or more, transformation into bainitic ferrite occurs while excessive dislocations are included in austenite, and the average crystal orientation difference of bainitic ferrite becomes too large, so that grains having an average crystal orientation difference of 0.4° to 3.0° are not generated. Furthermore, when the finish rolling is ended at a final rolling reduction of less than 5%, the amount of dislocations introduced into austenite is reduced, transformation from austenite into bainitic ferrite is delayed, so that in the surface layer region of the steel sheet for hot stamping, the ratio of grains having an average crystal orientation difference of 0.4° to 3.0° inside grains surrounded by grain boundaries having an average crystal orientation difference of 5° or more cannot be 80% or more by area %. The $A_3$ point is represented by Expression (1).

$$A_3 \text{ point} = 850 + 10 \times (C+N) \times Mn + 350 \times Nb + 250 \times Ti + 40 \times B + 10 \times Cr + 100 \times Mo \quad (1)$$

Here, the element symbol in Expression (1) indicates the amount of the corresponding element by mass %, and 0 is substituted in a case where the corresponding element is not contained.

"Cooling"

It is preferable that cooling is started within 0.5 seconds after the finish rolling is completed, and the average cooling rate down to a temperature range of 650° C. or lower is set to 30° C./s or faster. In a case where the time from the end of the finish rolling to the start of the cooling exceeds 0.5 seconds, or in a case where the average cooling rate down to the temperature range of 650° C. or lower is slower than 30° C./s, the dislocations introduced into austenite are recovered, and in the surface layer region of the steel sheet for hot stamping, the ratio of grains having an average crystal orientation difference of 0.4° to 3.0° inside grains surrounded by grain boundaries having an average crystal orientation difference of 5° or more cannot be 80% or more by area %.

It is preferable that after performing cooling to a temperature range of 650° C. or lower, slow cooling is performed in a temperature range of 550° C. or higher and lower than 650° C. at an average cooling rate of 1° C./s or faster and slower than 10° C./s. When slow cooling is performed in a temperature range of 650° C. or higher, phase transformation from austenite to ferrite occurs, and a desired metallographic structure cannot be obtained in the surface layer region of the steel sheet for hot stamping. When slow cooling is performed in a temperature range of lower than 550° C., the yield strength of austenite before transformation is high, so that grains having a large crystal orientation difference are likely to be formed adjacent to each other in bainitic ferrite in order to relax the transformation stress.

Therefore, grains having an average crystal orientation difference of 0.4° to 3.0° are not generated inside grains surrounded by grain boundaries having an average crystal orientation difference of 5° or more. When the average cooling rate in the above temperature range is slower than 1° C./s, C contained in bainitic ferrite segregates to subgrain boundaries, and Ni in the plating layer cannot diffuse into the surface layer of the steel sheet in a hot-stamping heating step. When the average cooling rate in the above temperature range is 10° C./s or faster, dislocation recovery does not occur near the grain boundaries of bainitic ferrite, and grains having an average crystal orientation difference of 0.4° to 3.0° are not generated inside grains surrounded by grain boundaries having an average crystal orientation difference of 5° or more. Therefore, the average cooling rate in the above temperature range is more preferably set to slower than 5° C./s.

It is preferable that after performing slow cooling to 550° C., cooling is performed in a temperature range of 550° C. or lower at an average cooling rate of 40° C./s or faster. When cooling is performed at an average cooling rate of slower than 40° C./s, C contained in bainitic ferrite segregates to subgrain boundaries, and Ni in the plating layer cannot diffuse into the surface layer of the steel sheet in the hot-stamping heating step. The cooling may be performed down to a temperature range of 350° C. to 500° C.

"Plating Application"

Using the hot-rolled steel sheet as it is or after being subjected to a softening heat treatment or cold rolling, a plating layer having an adhesion amount of 10 g/m² to 90 g/m² and a Ni content of 10 mass % to 25 mass %, and containing a remainder consisting of Zn and impurities is formed. Accordingly, a steel sheet for hot stamping is obtained. In the manufacturing of the steel sheet for hot stamping, a known manufacturing method such as pickling or temper rolling may be included before the plating is applied. In a case where cold rolling is performed before the plating is applied, the cumulative rolling reduction in the cold rolling is not particularly limited, but is preferably set to 30% to 70% from the viewpoint of shape stability of the steel sheet.

In addition, in softening annealing before the plating is applied, the heating temperature is preferably set to 760° C. or lower from the viewpoint of protecting the microstructure of the surface layer of the steel sheet. When tempering is performed at a temperature higher than 760° C., in the surface layer region, the area % of grains having an average crystal orientation difference of 0.4° to 3.0° inside grains surrounded by grain boundaries having an average crystal orientation difference of 5° or more cannot be 80% or more, and as a result, a hot-stamping formed body having a desired metallographic structure cannot be obtained. Therefore, in a case where tempering needs to be performed before the plating is applied due to a high C content or the like, softening annealing is performed at a temperature of 760° C. or lower.

<Method of Manufacturing Hot-Stamping Formed Body>

The hot-stamping formed body according to the present embodiment is manufactured by performing heating the above steel sheet for hot stamping in a temperature range of 500° C. to the $A_3$ point with an average heating rate of 100° C./s or faster and slower than 200° C./s, thereafter performing hot-stamping forming so that the elapsed time from the start of the heating to the forming is 120 to 260 seconds, and cooling the formed body to room temperature.

In addition, in order to adjust the strength of the hot-stamping formed body, a softened region may be formed by tempering a partial region or the entire region of the hot-stamping formed body at a temperature of 200° C. to 500° C.

In a case where heating is heating is performed in a temperature range of 500° C. to the $A_3$ point with an average heating rate of 100° C./s or faster and slower than 200° C./s, in the surface layer region of the steel sheet, the average grain size of the prior austenite grains can be set to 10.0 μm or less, and the Ni concentration per unit area at the grain boundaries having an average crystal orientation difference of 15° or more can be set to 1.5 mass %/μm² or more. Accordingly, excellent hydrogen embrittlement resistance can be obtained in the hot-stamping formed body. The average heating rate is preferably 120° C./s or faster. The upper limit of the average heating rate is set to 200° C./s because transformation into austenite is promoted without the dissolution of carbides contained in the steel sheet for hot stamping being completed and the hydrogen embrittlement resistance of the hot-stamping formed body deteriorates. The upper limit of the average heating rate at the above temperature range is preferably less than 180° C./s.

In addition, the elapsed time from the start of the heating to the forming (hot-stamping forming) is preferably set to 120 to 260 seconds. When the elapsed time from the start of the heating to the forming is shorter than 120 seconds or longer than 260 seconds, there may be cases where a desired metallographic structure cannot be obtained in the hot-stamping formed body.

The holding temperature at the time of hot stamping is preferably set to the $A_3$ point+10° C. to the $A_3$ point+150° C. The average cooling rate after the hot stamping is preferably set to 10° C./s or faster.

EXAMPLES

Next, examples of the present invention will be described. The conditions in the examples are one example of conditions adopted to confirm the feasibility and effects of the present invention, and the present invention is not limited to this one example of conditions. The present invention can adopt various conditions as long as the object of the present invention is achieved without departing from the gist of the present invention.

Steel pieces manufactured by casting molten steels having the chemical compositions shown in Tables 1 to 4 were subjected to hot rolling, cold rolling, and plating under the conditions shown in Tables 5, 7, 9, and 11 to obtain steel sheets for hot stamping shown in Tables 6, 8, 10, and 12. The obtained steel sheets for hot stamping were subjected to hot-stamping forming by heat treatments shown in Tables 13, 15, 17, and 19 to obtain hot-stamping formed bodies. Furthermore, for some of the hot-stamping formed bodies, a portion of the hot-stamping formed body was irradiated with a laser to be tempered, thereby forming a partially softened region. The tempering temperature by laser irradiation was set to 200° C. to 500° C.

Tables 14, 16, 18, and 20 show the microstructure and mechanical properties of the obtained hot-stamping formed bodies.

The underlines in the tables indicate those outside the range of the present invention, those deviating from preferable manufacturing conditions, and those having characteristic values that are not preferable.

TABLE 1

| Steel No. | Chemical composition (mass %) of base steel sheet, remainder consisting of Fe and impurities | | | | | | | Note |
|---|---|---|---|---|---|---|---|---|
| | C | Si | Mn | P | S | sol. Al | N | |
| 1 | 0.16 | 0.250 | 1.10 | 0.006 | 0.0020 | 0.030 | 0.0026 | Invention Steel |
| 2 | 0.44 | 0.250 | 1.80 | 0.010 | 0.0090 | 0.400 | 0.0040 | Invention Steel |
| 3 | 0.23 | 0.250 | 1.20 | 0.010 | 0.0100 | 0.030 | 0.0050 | Invention Steel |
| 4 | 0.08 | 0.220 | 0.81 | 0.008 | 0.0009 | 0.044 | 0.0026 | Comparative Steel |
| 5 | 0.16 | 0.150 | 0.71 | 0.011 | 0.0006 | 0.043 | 0.0037 | Invention Steel |
| 6 | 0.31 | 0.250 | 0.80 | 0.015 | 0.0011 | 0.041 | 0.0039 | Invention Steel |
| 7 | 0.36 | 0.180 | 0.81 | 0.005 | 0.0005 | 0.045 | 0.0037 | Invention Steel |
| 8 | 0.44 | 0.250 | 0.71 | 0.015 | 0.0007 | 0.034 | 0.0042 | Invention Steel |
| 9 | 0.67 | 0.190 | 0.71 | 0.014 | 0.0003 | 0.037 | 0.0035 | Invention Steel |
| 10 | 0.78 | 0.250 | 0.90 | 0.014 | 0.0011 | 0.031 | 0.0026 | Comparative Steel |
| 11 | 0.36 | 0.002 | 0.86 | 0.005 | 0.0003 | 0.041 | 0.0032 | Comparative Steel |
| 12 | 0.38 | 0.007 | 0.83 | 0.005 | 0.0011 | 0.050 | 0.0030 | Invention Steel |
| 13 | 0.37 | 0.210 | 0.72 | 0.011 | 0.0007 | 0.030 | 0.0041 | Invention Steel |
| 14 | 0.37 | 0.240 | 0.90 | 0.015 | 0.0007 | 0.047 | 0.0037 | Invention Steel |
| 15 | 0.37 | 0.150 | 0.15 | 0.005 | 0.0003 | 0.035 | 0.0030 | Comparative Steel |
| 16 | 0.44 | 0.170 | 0.44 | 0.007 | 0.0005 | 0.049 | 0.0029 | Invention Steel |
| 17 | 0.36 | 0.240 | 0.82 | 0.010 | 0.0011 | 0.035 | 0.0038 | Invention Steel |
| 18 | 0.37 | 0.180 | 1.29 | 0.007 | 0.0010 | 0.030 | 0.0028 | Invention Steel |
| 19 | 0.37 | 0.150 | 1.99 | 0.009 | 0.0005 | 0.035 | 0.0042 | Invention Steel |
| 20 | 0.38 | 0.170 | 2.89 | 0.007 | 0.0005 | 0.046 | 0.0037 | Invention Steel |
| 21 | 0.38 | 0.150 | 3.15 | 0.012 | 0.0009 | 0.036 | 0.0042 | Comparative Steel |
| 22 | 0.38 | 0.240 | 0.82 | 0.0004 | 0.0007 | 0.045 | 0.0026 | Invention Steel |
| 23 | 0.36 | 0.160 | 0.90 | 0.009 | 0.0006 | 0.030 | 0.0038 | Invention Steel |
| 24 | 0.36 | 0.150 | 0.77 | 0.094 | 0.0010 | 0.043 | 0.0033 | Invention Steel |
| 25 | 0.37 | 0.190 | 0.84 | 0.123 | 0.0010 | 0.033 | 0.0032 | Comparative Steel |
| 26 | 0.36 | 0.200 | 0.75 | 0.009 | 0.00015 | 0.047 | 0.0045 | Invention Steel |
| 27 | 0.37 | 0.150 | 0.81 | 0.013 | 0.0003 | 0.031 | 0.0029 | Invention Steel |
| 28 | 0.37 | 0.190 | 0.89 | 0.008 | 0.0022 | 0.044 | 0.0032 | Invention Steel |
| 29 | 0.36 | 0.230 | 0.80 | 0.007 | 0.0900 | 0.049 | 0.0030 | Invention Steel |
| 30 | 0.36 | 0.190 | 0.72 | 0.006 | 0.1334 | 0.045 | 0.0025 | Comparative Steel |

TABLE 2

| Steel No. | Chemical composition (mass %) of base steel sheet, remainder consisting of Fe and impurities | | | | | | | $A_3$ (° C.) | Note |
|---|---|---|---|---|---|---|---|---|---|
| | Nb | Ti | Mo | Cr | B | Ca | REM | | |
| 1 | | | 0.130 | | | | | 865 | Invention Steel |
| 2 | | | | | | | 0.03 | 858 | Invention Steel |
| 3 | | 0.020 | | 0.200 | | | | 860 | Invention Steel |
| 4 | | | | | | | | 851 | Comparative Steel |
| 5 | | | | | | | | 851 | Invention Steel |
| 6 | | | | | | | | 853 | Invention Steel |
| 7 | | | | | | | | 853 | Invention Steel |
| 8 | | | | | | | | 853 | Invention Steel |
| 9 | | | | | | | | 855 | Invention Steel |
| 10 | | | | | | | | 857 | Comparative Steel |
| 11 | | | | | | | | 853 | Comparative Steel |
| 12 | | | | | | | | 853 | Invention Steel |
| 13 | | | | | | | | 853 | Invention Steel |
| 14 | | | | | | | | 853 | Invention Steel |
| 15 | | | | | | | | 851 | Comparative Steel |
| 16 | | | | | | | | 852 | Invention Steel |
| 17 | | | | | | | | 853 | Invention Steel |
| 18 | | | | | | | | 855 | Invention Steel |
| 19 | | | | | | | | 857 | Invention Steel |
| 20 | | | | | | | | 861 | Invention Steel |
| 21 | | | | | | | | 862 | Comparative Steel |
| 22 | | | | | | | | 853 | Invention Steel |
| 23 | | | | | | | | 853 | Invention Steel |
| 24 | | | | | | | | 853 | Invention Steel |
| 25 | | | | | | | | 853 | Comparative Steel |
| 26 | | | | | | | | 853 | Invention Steel |
| 27 | | | | | | | | 853 | Invention Steel |
| 28 | | | | | | | | 853 | Invention Steel |
| 29 | | | | | | | | 853 | Invention Steel |
| 30 | | | | | | | | 853 | Comparative Steel |

TABLE 3

| Steel No. | Chemical composition (mass %) of base steel sheet, remainder consisting of Fe and impurities | | | | | | | Note |
|---|---|---|---|---|---|---|---|---|
| | C | Si | Mn | P | S | sol. Al | N | |
| 31 | 0.38 | 0.230 | 0.79 | 0.013 | 0.0008 | 0.0001 | 0.0027 | Comparative Steel |
| 32 | 0.38 | 0.160 | 0.85 | 0.010 | 0.0009 | 0.0003 | 0.0033 | Invention Steel |
| 33 | 0.35 | 0.200 | 0.72 | 0.014 | 0.0007 | 0.003 | 0.0042 | Invention Steel |
| 34 | 0.37 | 0.160 | 0.73 | 0.006 | 0.0006 | 0.031 | 0.0026 | Invention Steel |
| 35 | 0.35 | 0.240 | 0.83 | 0.009 | 0.0008 | 0.494 | 0.0034 | Invention Steel |
| 36 | 0.37 | 0.240 | 0.84 | 0.011 | 0.0007 | 0.581 | 0.0040 | Comparative Steel |
| 37 | 0.37 | 0.220 | 0.89 | 0.007 | 0.0007 | 0.035 | 0.0001 | Invention Steel |
| 38 | 0.38 | 0.150 | 0.89 | 0.009 | 0.0008 | 0.038 | 0.0073 | Invention Steel |
| 39 | 0.38 | 0.190 | 0.71 | 0.007 | 0.0007 | 0.039 | 0.0090 | Invention Steel |
| 40 | 0.36 | 0.210 | 0.73 | 0.008 | 0.0003 | 0.035 | 0.0160 | Comparative Steel |
| 41 | 0.37 | 0.230 | 0.87 | 0.009 | 0.0006 | 0.031 | 0.0025 | Invention Steel |
| 42 | 0.36 | 0.170 | 0.70 | 0.009 | 0.0009 | 0.046 | 0.0030 | Invention Steel |
| 43 | 0.37 | 0.220 | 0.73 | 0.008 | 0.0004 | 0.033 | 0.0038 | Invention Steel |
| 44 | 0.37 | 0.230 | 0.90 | 0.009 | 0.0011 | 0.044 | 0.0044 | Invention Steel |
| 45 | 0.35 | 0.170 | 0.89 | 0.011 | 0.0007 | 0.043 | 0.0028 | Invention Steel |
| 46 | 0.36 | 0.170 | 0.88 | 0.007 | 0.0004 | 0.031 | 0.0033 | Invention Steel |
| 47 | 0.36 | 0.210 | 0.80 | 0.005 | 0.0003 | 0.037 | 0.0035 | Invention Steel |
| 48 | 0.37 | 0.200 | 0.78 | 0.009 | 0.0010 | 0.031 | 0.0026 | Invention Steel |
| 49 | 0.38 | 0.160 | 0.82 | 0.015 | 0.0009 | 0.031 | 0.0041 | Invention Steel |
| 50 | 0.36 | 0.230 | 0.77 | 0.011 | 0.0008 | 0.043 | 0.0038 | Invention Steel |
| 51 | 0.35 | 0.160 | 0.70 | 0.005 | 0.0006 | 0.047 | 0.0026 | Invention Steel |
| 52 | 0.37 | 0.250 | 0.83 | 0.006 | 0.0010 | 0.033 | 0.0039 | Invention Steel |
| 53 | 0.37 | 0.150 | 0.70 | 0.015 | 0.0008 | 0.031 | 0.0044 | Invention Steel |
| 54 | 0.36 | 0.230 | 0.86 | 0.005 | 0.0003 | 0.050 | 0.0044 | Invention Steel |
| 55 | 0.36 | 0.160 | 0.74 | 0.015 | 0.0006 | 0.034 | 0.0044 | Invention Steel |
| 56 | 0.36 | 0.160 | 0.78 | 0.015 | 0.0006 | 0.037 | 0.0039 | Invention Steel |
| 57 | 0.36 | 0.190 | 0.80 | 0.010 | 0.0006 | 0.034 | 0.0027 | Invention Steel |
| 58 | 0.18 | 0.210 | 1.29 | 0.006 | 0.0020 | 0.030 | 0.0026 | Invention Steel |
| 59 | 0.21 | 0.220 | 1.31 | 0.006 | 0.0020 | 0.030 | 0.0028 | Invention Steel |
| 60 | 0.23 | 0.200 | 1.30 | 0.006 | 0.0020 | 0.030 | 0.0030 | Invention Steel |
| 61 | 0.25 | 0.190 | 1.28 | 0.006 | 0.0020 | 0.030 | 0.0029 | Invention Steel |

TABLE 4

| Steel No. | Chemical composition (mass %) of base steel sheet remainder consisting of Fe and impurities | | | | | | | $A_3$ (° C.) | Note |
|---|---|---|---|---|---|---|---|---|---|
| | Nb | Ti | Mo | Cr | B | Ca | REM | | |
| 31 | | | | | | | | 853 | Comparative Steel |
| 32 | | | | | | | | 853 | Invention Steel |
| 33 | | | | | | | | 853 | Invention Steel |
| 34 | | | | | | | | 853 | Invention Steel |
| 35 | | | | | | | | 853 | Invention Steel |
| 36 | | | | | | | | 853 | Comparative Steel |
| 37 | | | | | | | | 853 | Invention Steel |
| 38 | | | | | | | | 853 | Invention Steel |
| 39 | | | | | | | | 853 | Invention Steel |
| 40 | | | | | | | | 853 | Comparative Steel |
| 41 | 0.012 | | | | | | | 857 | Invention Steel |
| 42 | 0.032 | | | | | | | 864 | Invention Steel |
| 43 | 0.120 | | | | | | | 895 | Invention Steel |
| 44 | | 0.013 | | | | | | 857 | Invention Steel |
| 45 | | 0.036 | | | | | | 862 | Invention Steel |
| 46 | | 0.140 | | | | | | 888 | Invention Steel |
| 47 | | | 0.006 | | | | | 854 | Invention Steel |
| 48 | | | 0.012 | | | | | 854 | Invention Steel |
| 49 | | | 0.980 | | | | | 951 | Invention Steel |
| 50 | | | | 0.006 | | | | 853 | Invention Steel |
| 51 | | | | 0.009 | | | | 853 | Invention Steel |
| 52 | | | | 0.960 | | | | 863 | Invention Steel |
| 53 | | | | | 0.0006 | | | 853 | Invention Steel |
| 54 | | | | | 0.0011 | | | 853 | Invention Steel |
| 55 | | | | | 0.0090 | | | 853 | Invention Steel |
| 56 | | | | | | 0.008 | | 853 | Invention Steel |
| 57 | | | | | | | 0.28 | 853 | Invention Steel |
| 58 | | 0.017 | 0.120 | 0.207 | | | | 871 | Invention Steel |
| 59 | | 0.130 | | | | | | 866 | Invention Steel |
| 60 | | 0.121 | | | | | | 865 | Invention Steel |
| 61 | | 0.020 | 0.119 | 0.200 | | | | 872 | Invention Steel |

TABLE 5

| | | Hot rolling | | | | | | | | | |
|---|---|---|---|---|---|---|---|---|---|---|---|
| | | Rough rolling | | Finish rolling | | | Cooling | | | Cold rolling | Heat treatment before plating | |
| Steel No. | Steel sheet No. | Rolling temperature (° C.) | Cumulative rolling reduction (%) | Rolling temperature (° C.) | Final rolling reduction (%) | Cooling start time (sec) | Average cooling rate up to temperature range of 650° C. or lower (° C./s) | Average cooling rate at 550° C. or higher and lower than 650° C. (° C./s) | Average cooling rate in temperature range of 550° C. or lower (° C./s) | Cumulative rolling reduction (%) | Heating temperature (° C.) | Note |
| 1 | 1 | 1080 | 40 | 889 | 8 | 0.4 | 40 | 33 | 28 | 40 | Absent | Comparative Steel |
| 2 | 2 | 1100 | 40 | 970 | 30 | 0.3 | 40 | 11 | 30 | 40 | Absent | Comparative Steel |
| 3 | 3 | 1143 | 46 | 886 | 12 | 0.4 | 47 | 6 | 59 | 49 | 770 | Comparative Steel |
| 4 | 4 | 1099 | 49 | 905 | 11 | 0.4 | 48 | 5 | 60 | 59 | Absent | Comparative Steel |
| 5 | 5 | 1149 | 58 | 885 | 9 | 0.4 | 41 | 6 | 54 | 45 | Absent | Invention Steel |
| 6 | 6 | 1123 | 46 | 915 | 8 | 0.4 | 51 | 6 | 59 | 51 | Absent | Invention Steel |
| 7 | 7 | 1141 | 40 | 908 | 12 | 0.2 | 40 | 6 | 62 | 49 | Absent | Invention Steel |
| 8 | 8 | 1090 | 48 | 896 | 12 | 0.4 | 49 | 6 | 62 | 42 | Absent | Invention Steel |
| 9 | 9 | 1099 | 57 | 886 | 11 | 0.2 | 47 | 6 | 48 | 58 | Absent | Invention Steel |
| 10 | 10 | 1143 | 46 | 884 | 10 | 0.2 | 53 | 5 | 46 | 60 | Absent | Comparative Steel |
| 11 | 11 | 1128 | 51 | 890 | 10 | 0.3 | 40 | 6 | 60 | 49 | Absent | Comparative Steel |
| 12 | 12 | 1142 | 42 | 902 | 9 | 0.3 | 52 | 7 | 60 | 56 | Absent | Invention Steel |
| 13 | 13 | 1145 | 54 | 909 | 12 | 0.4 | 47 | 5 | 55 | 53 | Absent | Invention Steel |
| 14 | 14 | 1137 | 40 | 894 | 9 | 0.2 | 54 | 6 | 58 | 40 | Absent | Invention Steel |
| 15 | 15 | 1101 | 45 | 904 | 9 | 0.3 | 44 | 7 | 55 | 52 | Absent | Comparative Steel |
| 16 | 16 | 1121 | 57 | 881 | 9 | 0.4 | 43 | 5 | 46 | 58 | Absent | Invention Steel |
| 17 | 17 | 1103 | 46 | 915 | 11 | 0.4 | 44 | 5 | 50 | 44 | Absent | Invention Steel |
| 18 | 18 | 1130 | 53 | 892 | 11 | 0.4 | 43 | 6 | 59 | 43 | Absent | Invention Steel |
| 19 | 19 | 1095 | 55 | 908 | 10 | 0.2 | 52 | 7 | 65 | 59 | Absent | Invention Steel |
| 20 | 20 | 1136 | 59 | 885 | 8 | 0.3 | 48 | 4 | 65 | 51 | Absent | Invention Steel |
| 21 | 21 | 1107 | 41 | 881 | 10 | 0.3 | 50 | 6 | 49 | 42 | Absent | Comparative Steel |
| 22 | 22 | 1123 | 44 | 888 | 12 | 0.4 | 43 | 4 | 63 | 58 | Absent | Invention Steel |
| 23 | 23 | 1123 | 44 | 888 | 11 | 0.3 | 55 | 7 | 46 | 49 | Absent | Invention Steel |

TABLE 5-continued

| | | Hot rolling | | | | | | | | | |
|---|---|---|---|---|---|---|---|---|---|---|---|
| | | Rough rolling | | Finish rolling | | Cooling | | | | | |
| Steel No. | Steel sheet No. | Rolling temperature (° C.) | Cumulative rolling reduction (%) | Rolling temperature (° C.) | Final rolling reduction (%) | Cooling start time (sec) | Average cooling rate up to temperature range of 650° C. or lower (° C./s) | Average cooling rate at 550° C. or higher and lower than 650° C. (° C./s) | Average cooling rate in temperature range of 550° C. or lower (° C./s) | Cold rolling Cumulative rolling reduction (%) | Heat treatment before plating Heating temperature (° C.) | Note |
| 24 | 24 | 1080 | 51 | 884 | 10 | 0.2 | 48 | 5 | 57 | 50 | Absent | Invention Steel |
| 25 | 25 | 1120 | 43 | 918 | 10 | 0.3 | 43 | 6 | 48 | 60 | Absent | Comparative Steel |
| 26 | 26 | 1124 | 48 | 888 | 8 | 0.4 | 50 | 4 | 58 | 60 | Absent | Invention Steel |
| 27 | 27 | 1078 | 49 | 892 | 10 | 0.3 | 40 | 7 | 62 | 51 | Absent | Invention Steel |
| 28 | 28 | 1127 | 47 | 892 | 12 | 0.2 | 51 | 5 | 62 | 46 | Absent | Invention Steel |
| 29 | 29 | 1101 | 58 | 887 | 11 | 0.4 | 53 | 4 | 50 | 47 | Absent | Invention Steel |
| 30 | 30 | 1112 | 56 | 909 | 10 | 0.2 | 47 | 5 | 56 | 46 | Absent | Comparative Steel |

TABLE 6

| | | Steel sheet for hot stamping | | | | |
|---|---|---|---|---|---|---|
| Steel No. | Steel sheet No. | Plating adhesion amount (g/m$^2$) | Ni content in plating layer (mass %) | Grains having average crystal orientation difference of 0.4° to 3.0° (area %) | Sheet thickness (mm) | Note |
| 1 | 1 | 41 | 15 | 30 | 1.6 | Comparative Steel |
| 2 | 2 | 53 | 12 | 25 | 1.6 | Comparative Steel |
| 3 | 3 | 40 | 12 | 3 | 1.6 | Comparative Steel |
| 4 | 4 | 56 | 15 | 86 | 1.6 | Comparative Steel |
| 5 | 5 | 50 | 14 | 87 | 1.4 | Invention Steel |
| 6 | 6 | 41 | 15 | 90 | 1.6 | Invention Steel |
| 7 | 7 | 54 | 17 | 89 | 1.8 | Invention Steel |
| 8 | 8 | 57 | 15 | 88 | 1.6 | Invention Steel |
| 9 | 9 | 40 | 16 | 89 | 1.9 | Invention Steel |
| 10 | 10 | 53 | 17 | 89 | 1.5 | Comparative Steel |
| 11 | 11 | 48 | 12 | 46 | 1.8 | Comparative Steel |
| 12 | 12 | 58 | 16 | 82 | 1.4 | Invention Steel |
| 13 | 13 | 48 | 17 | 84 | 1.6 | Invention Steel |
| 14 | 14 | 46 | 14 | 89 | 1.6 | Invention Steel |
| 15 | 15 | 58 | 10 | 92 | 1.7 | Comparative Steel |
| 16 | 16 | 51 | 17 | 89 | 1.4 | Invention Steel |
| 17 | 17 | 43 | 11 | 85 | 1.8 | Invention Steel |
| 18 | 18 | 52 | 12 | 93 | 1.6 | Invention Steel |
| 19 | 19 | 50 | 13 | 89 | 1.6 | Invention Steel |
| 20 | 20 | 45 | 11 | 93 | 1.9 | Invention Steel |
| 21 | 21 | 45 | 14 | 91 | 1.5 | Comparative Steel |
| 22 | 22 | 60 | 14 | 86 | 2.0 | Invention Steel |
| 23 | 23 | 47 | 15 | 91 | 1.9 | Invention Steel |
| 24 | 24 | 60 | 15 | 87 | 1.7 | Invention Steel |
| 25 | 25 | 58 | 13 | 87 | 1.4 | Comparative Steel |
| 26 | 26 | 60 | 15 | 87 | 1.8 | Invention Steel |
| 27 | 27 | 52 | 12 | 86 | 2.0 | Invention Steel |
| 28 | 28 | 50 | 10 | 86 | 1.4 | Invention Steel |
| 29 | 29 | 53 | 15 | 88 | 1.5 | Invention Steel |
| 30 | 30 | 51 | 11 | 90 | 1.5 | Comparative Steel |

TABLE 7

| Steel No. | Steel sheet No. | Hot rolling | | | | | | Hot rolling Cooling | | Cold rolling Cumulative rolling reduction (%) | Heat treatment before plating Heating temperature (° C.) | Note |
|---|---|---|---|---|---|---|---|---|---|---|---|---|
| | | Rough rolling | | Finish rolling | | Cooling | | | | | | |
| | | Rolling temperature (° C.) | Cumulative rolling reduction (%) | Rolling temperature (° C.) | Final rolling reduction (%) | Cooling start time (sec) | Average cooling rate up to temperature range of 650° C. or lower (° C./s) | Average cooling rate at 550° C. or higher and lower than 650° C. (° C./s) | Average cooling rate in temperature range of 550° C. or lower (° C./s) | | | |
| 31 | 31 | 1108 | 46 | 902 | 10 | 0.4 | 40 | 6 | 45 | 49 | Absent | Comparative Steel |
| 32 | 32 | 1136 | 60 | 918 | 8 | 0.2 | 54 | 5 | 45 | 48 | Absent | Invention Steel |
| 33 | 33 | 1128 | 56 | 895 | 12 | 0.2 | 41 | 6 | 57 | 43 | Absent | Invention Steel |
| 34 | 34 | 1127 | 54 | 914 | 10 | 0.3 | 51 | 4 | 48 | 48 | Absent | Invention Steel |
| 35 | 35 | 1118 | 47 | 881 | 10 | 0.3 | 51 | 4 | 64 | 57 | Absent | Invention Steel |
| 36 | 36 | 1081 | 40 | 904 | 9 | 0.3 | 42 | 6 | 49 | 44 | Absent | Comparative Steel |
| 37 | 37 | 1103 | 52 | 881 | 11 | 0.2 | 53 | 6 | 52 | 57 | Absent | Invention Steel |
| 38 | 38 | 1081 | 41 | 889 | 9 | 0.2 | 53 | 7 | 56 | 59 | Absent | Invention Steel |
| 39 | 39 | 1085 | 50 | 891 | 12 | 0.2 | 42 | 6 | 45 | 57 | Absent | Invention Steel |
| 40 | 40 | 1073 | 53 | 901 | 10 | 0.2 | 53 | 4 | 45 | 60 | Absent | Comparative Steel |
| 41 | 41 | 1128 | 55 | 917 | 12 | 0.2 | 50 | 7 | 53 | 57 | Absent | Invention Steel |
| 42 | 42 | 1142 | 41 | 893 | 9 | 0.4 | 48 | 7 | 62 | 57 | Absent | Invention Steel |
| 43 | 43 | 1090 | 54 | 890 | 12 | 0.2 | 53 | 7 | 49 | 54 | Absent | Invention Steel |
| 44 | 44 | 1080 | 58 | 891 | 9 | 0.4 | 40 | 7 | 46 | 56 | Absent | Invention Steel |
| 45 | 45 | 1126 | 53 | 890 | 10 | 0.2 | 52 | 6 | 50 | 42 | Absent | Invention Steel |
| 46 | 46 | 1093 | 60 | 913 | 11 | 0.2 | 44 | 6 | 65 | 53 | Absent | Invention Steel |
| 47 | 47 | 1136 | 52 | 882 | 12 | 0.2 | 54 | 6 | 57 | 52 | Absent | Invention Steel |
| 48 | 48 | 1079 | 49 | 917 | 11 | 0.4 | 42 | 5 | 53 | 45 | Absent | Invention Steel |
| 49 | 49 | 1112 | 57 | 892 | 8 | 0.3 | 41 | 4 | 64 | 45 | Absent | Invention Steel |
| 50 | 50 | 1094 | 45 | 886 | 10 | 0.4 | 41 | 6 | 48 | 56 | Absent | Invention Steel |
| 51 | 51 | 1121 | 51 | 896 | 12 | 0.2 | 52 | 7 | 47 | 57 | Absent | Invention Steel |
| 52 | 52 | 1070 | 52 | 913 | 11 | 0.2 | 46 | 6 | 61 | 55 | Absent | Invention Steel |
| 53 | 53 | 1109 | 56 | 910 | 11 | 0.4 | 47 | 4 | 45 | 43 | Absent | Invention Steel |
| 54 | 54 | 1080 | 58 | 901 | 11 | 0.4 | 49 | | | | | |
| 55 | 55 | 1129 | 42 | 903 | 8 | 0.4 | 49 | | | | | |
| 56 | 56 | 1098 | 40 | 919 | 9 | 0.3 | 43 | | | | | |
| 57 | 57 | 1079 | 57 | 887 | 12 | 0.4 | 50 | | | | | |

TABLE 7-continued

| | | | | | |
|---|---|---|---|---|---|
| 54 | 6 | 60 | 45 | Absent | Invention Steel |
| 55 | 7 | 55 | 54 | Absent | Invention Steel |
| 56 | 5 | 58 | 52 | Absent | Invention Steel |
| 57 | 7 | 57 | 52 | Absent | Invention Steel |

TABLE 8

Steel sheet for hot stamping

| Steel No. | Steel sheet No. | Plating adhesion amount (g/m$^2$) | Ni content in plating layer (mass %) | Grains having average crystal orientation difference of 0.4° to 3.0° (area %) | Sheet thickness (mm) | Note |
|---|---|---|---|---|---|---|
| 31 | 31 | 46 | 16 | 90 | 1.5 | Comparative Steel |
| 32 | 32 | 40 | 16 | 87 | 2.0 | Invention Steel |
| 33 | 33 | 43 | 13 | 92 | 1.8 | Invention Steel |
| 34 | 34 | 46 | 16 | 85 | 1.6 | Invention Steel |
| 35 | 35 | 51 | 14 | 92 | 1.4 | Invention Steel |
| 36 | 36 | 47 | 13 | 90 | 1.5 | Comparative Steel |
| 37 | 37 | 52 | 12 | 92 | 1.6 | Invention Steel |
| 38 | 38 | 46 | 17 | 86 | 1.5 | Invention Steel |
| 39 | 39 | 60 | 16 | 91 | 1.9 | Invention Steel |
| 40 | 40 | 60 | 17 | 88 | 1.8 | Comparative Steel |
| 41 | 41 | 45 | 15 | 91 | 1.7 | Invention Steel |
| 42 | 42 | 58 | 15 | 86 | 1.5 | Invention Steel |
| 43 | 43 | 59 | 12 | 85 | 1.7 | Invention Steel |
| 44 | 44 | 45 | 17 | 86 | 1.9 | Invention Steel |
| 45 | 45 | 42 | 17 | 86 | 1.5 | Invention Steel |
| 46 | 46 | 58 | 16 | 91 | 1.8 | Invention Steel |
| 47 | 47 | 42 | 14 | 88 | 1.8 | Invention Steel |
| 48 | 48 | 48 | 13 | 86 | 1.7 | Invention Steel |
| 49 | 49 | 58 | 12 | 87 | 2.0 | Invention Steel |
| 50 | 50 | 42 | 10 | 86 | 1.4 | Invention Steel |
| 51 | 51 | 51 | 15 | 88 | 1.4 | Invention Steel |
| 52 | 52 | 60 | 10 | 91 | 1.9 | Invention Steel |
| 53 | 53 | 49 | 11 | 88 | 1.7 | Invention Steel |
| 54 | 54 | 40 | 16 | 87 | 1.6 | Invention Steel |
| 55 | 55 | 54 | 10 | 85 | 1.9 | Invention Steel |
| 56 | 56 | 44 | 14 | 90 | 2.0 | Invention Steel |
| 57 | 57 | 46 | 17 | 87 | 1.8 | Invention Steel |

TABLE 9

| | | Hot rolling | | | | | |
|---|---|---|---|---|---|---|---|
| | | Rough rolling | | Finish rolling | | | Cooling |
| Steel No. | Steel sheet No. | Rolling temperature (° C.) | Cumulative rolling reduction (%) | Rolling temperature (° C.) | Final rolling reduction (%) | Cooling start time (sec) | Average cooling rate up to temperature range of 650° C. or lower (° C./s) |
| 7 | 58 | 990 | 57 | 894 | 11 | 0.3 | 52 |
| 7 | 59 | 1065 | 52 | 891 | 10 | 0.2 | 43 |
| 7 | 60 | 1133 | 36 | 911 | 11 | 0.3 | 47 |
| 7 | 61 | 1084 | 42 | 896 | 12 | 0.3 | 42 |
| 7 | 62 | 1113 | 45 | 790 | 10 | 0.2 | 48 |
| 7 | 63 | 1126 | 53 | 839 | 12 | 0.2 | 41 |
| 7 | 64 | 1074 | 51 | 914 | 3 | 0.2 | 40 |
| 7 | 65 | 1086 | 45 | 917 | 6 | 0.4 | 45 |
| 7 | 66 | 1074 | 58 | 915 | 9 | 0.3 | 46 |
| 7 | 67 | 1149 | 49 | 892 | 17 | 0.2 | 54 |
| 7 | 68 | 1100 | 57 | 890 | 26 | 0.4 | 51 |
| 7 | 69 | 1090 | 52 | 908 | 8 | 0.3 | 49 |

TABLE 9-continued

| 7 | 70 | 1119 | 46 | 914 | 9 | 0.4 | 55 |
|---|----|------|----|-----|---|-----|----|
| 7 | 71 | 1096 | 58 | 909 | 10 | 0.7 | 51 |
| 7 | 72 | 1075 | 48 | 883 | 10 | 0.4 | 26 |
| 7 | 73 | 1081 | 55 | 905 | 12 | 0.4 | 33 |
| 7 | 74 | 1118 | 47 | 895 | 8 | 0.4 | 49 |
| 7 | 75 | 1130 | 49 | 912 | 11 | 0.2 | 44 |
| 7 | 76 | 1093 | 49 | 885 | 11 | 0.2 | 42 |
| 7 | 77 | 1141 | 51 | 906 | 11 | 0.2 | 52 |
| 7 | 78 | 1147 | 58 | 882 | 10 | 0.4 | 47 |
| 7 | 79 | 1144 | 51 | 916 | 8 | 0.4 | 41 |
| 7 | 80 | 1096 | 51 | 896 | 9 | 0.3 | 41 |
| 7 | 81 | 1094 | 50 | 886 | 12 | 0.3 | 50 |
| 7 | 82 | 1107 | 51 | 919 | 10 | 0.4 | 41 |
| 7 | 83 | 1087 | 54 | 910 | 9 | 0.4 | 43 |
| 7 | 84 | 1078 | 55 | 913 | 12 | 0.2 | 46 |
| 7 | 85 | 1089 | 43 | 904 | 12 | 0.3 | 44 |
| 7 | 86 | 1109 | 49 | 896 | 9 | 0.2 | 51 |
| 7 | 87 | 1149 | 52 | 898 | 8 | 0.4 | 53 |
| 7 | 88 | 1141 | 47 | 895 | 8 | 0.2 | 51 |
| 7 | 89 | 1096 | 49 | 906 | 10 | 0.4 | 52 |
| 7 | 90 | 1107 | 51 | 916 | 9 | 0.4 | 41 |
| 7 | 91 | 1087 | 51 | 886 | 12 | 0.2 | 41 |
| 7 | 92 | 1078 | 50 | 913 | 10 | 0.2 | 46 |

| Steel No. | Hot rolling Cooling Average cooling rate at 550° C. or higher and lower than 650° C. (° C./s) | Hot rolling Cooling Average cooling rate in temperature range of 550° C. or lower (° C./s) | Cold rolling Cumulative rolling reduction (%) | Heat treatment before plating Heating temperature (° C.) | Note |
|---|---|---|---|---|---|
| 7 | 4 | 48 | 60 | Absent | Comparative Steel |
| 7 | 7 | 60 | 46 | Absent | Invention Steel |
| 7 | 7 | 52 | 55 | Absent | Comparative Steel |
| 7 | 4 | 54 | 49 | Absent | Invention Steel |
| 7 | 4 | 48 | 48 | Absent | Comparative Steel |
| 7 | 6 | 47 | 53 | Absent | Invention Steel |
| 7 | 5 | 53 | 47 | Absent | Comparative Steel |
| 7 | 5 | 49 | 45 | Absent | Invention Steel |
| 7 | 6 | 63 | 50 | Absent | Invention Steel |
| 7 | 6 | 65 | 57 | Absent | Invention Steel |
| 7 | 5 | 56 | 59 | Absent | Comparative Steel |
| 7 | 5 | 48 | 49 | Absent | Invention Steel |
| 7 | 7 | 57 | 43 | Absent | Invention Steel |
| 7 | 5 | 51 | 57 | Absent | Comparative Steel |
| 7 | 4 | 56 | 55 | Absent | Comparative Steel |
| 7 | 4 | 55 | 43 | Absent | Invention Steel |
| 7 | 6 | 62 | 47 | Absent | Invention Steel |
| 7 | 0.6 | 54 | 52 | Absent | Comparative Steel |
| 7 | 2 | 64 | 44 | Absent | Invention Steel |
| 7 | 5 | 57 | 44 | Absent | Invention Steel |
| 7 | 9 | 55 | 57 | Absent | Invention Steel |
| 7 | 13 | 45 | 55 | Absent | Comparative Steel |
| 7 | 7 | 34 | 41 | Absent | Comparative Steel |
| 7 | 7 | 41 | 47 | Absent | Invention Steel |
| 7 | 5 | 59 | 49 | Absent | Invention Steel |
| 7 | 5 | 50 | 0 | Absent | Invention Steel |
| 7 | 4 | 64 | 40 | 711 | Invention Steel |
| 7 | 6 | 62 | 58 | Absent | Invention Steel |
| 7 | 5 | 61 | 48 | Absent | Invention Steel |
| 7 | 6 | 46 | 45 | Absent | Invention Steel |
| 7 | 6 | 65 | 57 | Absent | Invention Steel |
| 7 | 5 | 56 | 43 | Absent | Invention Steel |
| 7 | 4 | 55 | 47 | Absent | Invention Steel |
| 7 | 5 | 64 | 44 | Absent | Invention Steel |
| 7 | 4 | 62 | 41 | Absent | Invention Steel |

TABLE 10

| | | Steel sheet for hot stamping | | | | |
|---|---|---|---|---|---|---|
| Steel No. | Steel sheet No. | Plating adhesion amount (g/m²) | Ni content in plating layer (mass %) | Grains having average crystal orientation difference of 0.4° to 3.0° (area %) | Sheet thickness (mm) | Note |
| 7 | 58 | 58 | 17 | <u>66</u> | 1.8 | Comparative Steel |
| 7 | 59 | 54 | 17 | 82 | 1.8 | Invention Steel |
| 7 | 60 | 59 | 11 | <u>56</u> | 1.4 | Comparative Steel |
| 7 | 61 | 41 | 16 | 82 | 1.9 | Invention Steel |
| 7 | 62 | 54 | 14 | <u>61</u> | 1.4 | Comparative Steel |
| 7 | 63 | 51 | 13 | 84 | 1.9 | Invention Steel |
| 7 | 64 | 42 | 13 | <u>57</u> | 1.6 | Comparative Steel |
| 7 | 65 | 43 | 17 | 83 | 1.4 | Invention Steel |
| 7 | 66 | 44 | 11 | 85 | 1.4 | Invention Steel |
| 7 | 67 | 49 | 10 | 82 | 1.5 | Invention Steel |
| 7 | 68 | 44 | 17 | <u>68</u> | 1.5 | Comparative Steel |
| 7 | 69 | 43 | 11 | 86 | 1.7 | Invention Steel |
| 7 | 70 | 60 | 10 | 82 | 1.4 | Invention Steel |
| 7 | 71 | 52 | 11 | <u>58</u> | 1.5 | Comparative Steel |
| 7 | 72 | 55 | 11 | <u>59</u> | 1.9 | Comparative Steel |
| 7 | 73 | 42 | 17 | 82 | 1.8 | Invention Steel |
| 7 | 74 | 45 | 15 | 84 | 1.7 | Invention Steel |
| 7 | 75 | 51 | 10 | <u>74</u> | 2.0 | Comparative Steel |
| 7 | 76 | 42 | 17 | 82 | 1.9 | Invention Steel |
| 7 | 77 | 50 | 14 | 81 | 1.4 | Invention Steel |
| 7 | 78 | 45 | 17 | 83 | 1.7 | Invention Steel |
| 7 | 79 | 54 | 15 | <u>28</u> | 1.6 | Comparative Steel |
| 7 | 80 | 45 | 10 | <u>76</u> | 1.4 | Comparative Steel |
| 7 | 81 | 40 | 10 | 81 | 2.0 | Invention Steel |
| 7 | 82 | 52 | 10 | 83 | 2.0 | Invention Steel |
| 7 | 83 | 49 | 12 | 86 | 1.4 | Invention Steel |
| 7 | 84 | 40 | 12 | 90 | 1.6 | Invention Steel |
| 7 | 85 | 50 | 13 | 85 | 1.9 | Invention Steel |
| 7 | 86 | 40 | 17 | 82 | 1.7 | Invention Steel |
| 7 | 87 | 52 | 10 | 83 | 1.5 | Invention Steel |
| 7 | 88 | 49 | 11 | 85 | 1.7 | Invention Steel |
| 7 | 89 | 55 | 11 | 82 | 1.4 | Invention Steel |
| 7 | 90 | 45 | 15 | 84 | 1.8 | Invention Steel |
| 7 | 91 | 45 | 17 | 83 | 1.9 | Invention Steel |
| 7 | 92 | 45 | 10 | 90 | 1.7 | Invention Steel |

TABLE 11

| | | Hot rolling | | | | | |
|---|---|---|---|---|---|---|---|
| | | Rough rolling | | Finish rolling | | Cooling | |
| Steel No. | Steel sheet No. | Rolling temperature (° C.) | Cumulative rolling reduction (%) | Rolling temperature (° C.) | Final rolling reduction (%) | Cooling start time (sec) | Average cooling rate up to temperature range of 650° C. or lower (° C./s) |
| 58 | 93 | 1150 | 57 | 917 | 11 | 0.3 | 47 |
| 59 | 94 | 1131 | 46 | 890 | 10 | 0.2 | 48 |
| 60 | 95 | 1110 | 48 | 908 | 10 | 0.2 | 40 |
| 61 | 96 | 1108 | 55 | 883 | 12 | 0.2 | 54 |
| 7 | 97 | 1099 | 47 | 906 | 8 | 0.3 | 49 |
| 7 | 98 | 1088 | 47 | 919 | 10 | 0.4 | 55 |
| 7 | 99 | 1103 | 51 | 913 | 12 | 0.2 | 51 |
| 7 | 100 | 1098 | 50 | 895 | 9 | 0.2 | 43 |

TABLE 11-continued

| | Hot rolling Cooling | | | | |
|---|---|---|---|---|---|
| Steel No. | Average cooling rate at 550° C. or higher and lower than 650° C. (° C./s) | Average cooling rate in temperature range of 550° C. or lower (° C./s) | Cold rolling Cumulative rolling reduction (%) | Heat treatment before plating Heating temperature (° C.) | Note |
| 58 | 6 | 47 | 45 | Absent | Invention Steel |
| 59 | 5 | 49 | 45 | Absent | Invention Steel |
| 60 | 6 | 56 | 45 | Absent | Invention Steel |
| 61 | 5 | 57 | 45 | Absent | Invention Steel |
| 7 | 3 | 55 | 45 | Absent | Invention Steel |
| 7 | 2 | 62 | 45 | Absent | Invention Steel |
| 7 | 2 | 54 | 45 | Absent | Invention Steel |
| 7 | 3 | 51 | 45 | Absent | Invention Steel |

TABLE 12

| | | Steel sheet for hot stamping | | | | |
|---|---|---|---|---|---|---|
| Steel No. | Steel sheet No. | Plating adhesion amount (g/m$^2$) | Ni content in plating layer (mass %) | Grains having average crystal orientation difference of 0.4° to 3.0° (area %) | Sheet thickness (mm) | Note |
| 58 | 93 | 49 | 11 | 90 | 1.4 | Invention Steel |
| 59 | 94 | 40 | 13 | 82 | 1.4 | Invention Steel |
| 60 | 95 | 49 | 10 | 85 | 1.4 | Invention Steel |
| 61 | 96 | 45 | 10 | 84 | 1.6 | Invention Steel |
| 7 | 97 | 45 | 11 | 95 | 1.4 | Invention Steel |
| 7 | 98 | 51 | 17 | 94 | 1.6 | Invention Steel |
| 7 | 99 | 50 | 14 | 96 | 1.6 | Invention Steel |
| 7 | 100 | 52 | 15 | 95 | 1.4 | Invention Steel |

TABLE 13

| | | | Heat treatment step during hot stamping | | | | | |
|---|---|---|---|---|---|---|---|---|
| Steel No. | Steel sheet No. | Manufacturing No. | Average heating rate (° C./s) | Holding temperature (° C.) | Elapsed time from start of heating to forming (s) | Tempering temperature (° C.) | Partially softened region | Note |
| 1 | 1 | B1 | 151 | 892 | 231 | Absent | Absent | Comparative Steel |
| 2 | 2 | B2 | 135 | 889 | 243 | Absent | Absent | Comparative Steel |
| 3 | 3 | B3 | 138 | 901 | 221 | Absent | Absent | Comparative Steel |
| 4 | 4 | B4 | 152 | 920 | 221 | Absent | Absent | Comparative Steel |
| 5 | 5 | B5 | 158 | 912 | 231 | Absent | Absent | Invention Steel |
| 6 | 6 | B6 | 148 | 912 | 258 | Absent | Absent | Invention Steel |
| 7 | 7 | B7 | 140 | 887 | 231 | Absent | Absent | Invention Steel |
| 8 | 8 | B8 | 125 | 910 | 257 | Absent | Absent | Invention Steel |
| 9 | 9 | B9 | 150 | 895 | 225 | 440 | Absent | Invention Steel |
| 10 | 10 | B10 | 125 | 904 | 250 | Absent | Absent | Comparative Steel |
| 11 | 11 | B11 | 136 | 905 | 246 | Absent | Absent | Comparative Steel |
| 12 | 12 | B12 | 127 | 886 | 243 | Absent | Absent | Invention Steel |
| 13 | 13 | B13 | 159 | 898 | 246 | Absent | Absent | Invention Steel |
| 14 | 14 | B14 | 134 | 912 | 226 | Absent | Absent | Invention Steel |
| 15 | 15 | B15 | 159 | 895 | 242 | Absent | Absent | Comparative Steel |
| 16 | 16 | B16 | 134 | 905 | 248 | Absent | Absent | Invention Steel |
| 17 | 17 | B17 | 126 | 908 | 232 | Absent | Absent | Invention Steel |
| 18 | 18 | B18 | 143 | 892 | 252 | Absent | Absent | Invention Steel |
| 19 | 19 | B19 | 142 | 905 | 228 | Absent | Absent | Invention Steel |
| 20 | 20 | B20 | 134 | 891 | 235 | Absent | Absent | Invention Steel |
| 21 | 21 | B21 | 121 | 894 | 250 | Absent | Absent | Comparative Steel |

TABLE 13-continued

| | | | Heat treatment step during hot stamping | | | | | |
|---|---|---|---|---|---|---|---|---|
| Steel No. | Steel sheet No. | Manufacturing No. | Average heating rate (° C./s) | Holding temperature (° C.) | Elapsed time from start of heating to forming (s) | Tempering temperature (° C.) | Partially softened region | Note |
| 22 | 22 | B22 | 136 | 907 | 226 | Absent | Absent | Invention Steel |
| 23 | 23 | B23 | 140 | 884 | 220 | Absent | Absent | Invention Steel |
| 24 | 24 | B24 | 132 | 913 | 225 | Absent | Absent | Invention Steel |
| <u>25</u> | <u>25</u> | B25 | 149 | 884 | 250 | Absent | Absent | Comparative Steel |
| 26 | 26 | B26 | 137 | 883 | 232 | Absent | Absent | Invention Steel |
| 27 | 27 | B27 | 122 | 893 | 226 | Absent | Absent | Invention Steel |
| 28 | 28 | B28 | 133 | 918 | 250 | Absent | Absent | Invention Steel |
| 29 | 29 | B29 | 140 | 880 | 255 | Absent | Absent | Invention Steel |
| <u>30</u> | <u>30</u> | B30 | 144 | 905 | 258 | Absent | Absent | Comparative Steel |

TABLE 14

| | | | | Microstructure of hot-stamping formed body | | | | | |
|---|---|---|---|---|---|---|---|---|---|
| Steel No. | Steel sheet No. | Manufacturing No. | Plating adhesion amount (g/m$^2$) | Ni content in plating layer (mass %) | Average grain size of prior austenite grains (μm) | Ni concentration per unit area at grain boundaries having crystal orientation difference of 15° or more (mass %/μm$^2$) | Tensile strength (MPa) | Hydrogen embrittlement resistance | Note |
| 1 | 1 | B1 | 41 | 15 | 7.0 | <u>0.2</u> | 2026 | <u>NG</u> | Comparative Steel |
| 2 | <u>2</u> | B2 | 53 | 12 | 7.0 | <u>0.3</u> | 2113 | <u>NG</u> | Comparative Steel |
| 3 | <u>3</u> | B3 | 40 | 12 | 6.3 | <u>0.6</u> | 2019 | <u>NG</u> | Comparative Steel |
| 4 | <u>4</u> | B4 | 56 | 15 | 6.1 | 1.9 | <u>960</u> | OK | Comparative Steel |
| 5 | <u>5</u> | B5 | 50 | 14 | 6.7 | 1.8 | <u>1590</u> | OK | Invention Steel |
| 6 | 6 | B6 | 41 | 15 | 5.2 | 1.7 | 1920 | OK | Invention Steel |
| 7 | 7 | B7 | 54 | 17 | 7.1 | 1.7 | 2021 | OK | Invention Steel |
| 8 | 8 | B8 | 57 | 15 | 8.0 | 1.8 | 2530 | OK | Invention Steel |
| 9 | 9 | B9 | 40 | 16 | 6.0 | 2.2 | 2560 | OK | Invention Steel |
| <u>10</u> | <u>10</u> | B10 | 53 | 17 | 7.9 | <u>1.3</u> | 2781 | <u>NG</u> | Comparative Steel |
| <u>11</u> | <u>11</u> | B11 | 48 | 12 | 5.5 | <u>0.3</u> | 2101 | <u>NG</u> | Comparative Steel |
| <u>12</u> | <u>12</u> | B12 | 58 | 16 | 7.1 | <u>1.7</u> | 2045 | <u>OK</u> | Invention Steel |
| 13 | 13 | B13 | 48 | 17 | 6.8 | 1.7 | 2128 | OK | Invention Steel |
| 14 | 14 | B14 | 46 | 14 | 5.3 | 2.4 | 2092 | OK | Invention Steel |
| <u>15</u> | <u>15</u> | B15 | 58 | 10 | 7.5 | 1.5 | <u>1430</u> | OK | Comparative Steel |
| <u>16</u> | <u>16</u> | B16 | 51 | 17 | 5.1 | 1.8 | <u>2541</u> | OK | Invention Steel |
| 17 | 17 | B17 | 43 | 11 | 5.1 | 2.3 | 1881 | OK | Invention Steel |
| 18 | 18 | B18 | 52 | 12 | 6.1 | 1.7 | 1910 | OK | Invention Steel |
| 19 | 19 | B19 | 50 | 13 | 5.5 | 2.2 | 1980 | OK | Invention Steel |
| 20 | 20 | B20 | 45 | 11 | 7.1 | 1.6 | 1519 | OK | Invention Steel |
| <u>21</u> | <u>21</u> | B21 | 45 | 14 | 6.0 | 2.2 | 1511 | <u>NG</u> | Comparative Steel |
| <u>22</u> | <u>22</u> | B22 | 60 | 14 | 7.3 | 2.0 | 2076 | <u>OK</u> | Invention Steel |
| 23 | 23 | B23 | 47 | 15 | 5.7 | 1.6 | 2015 | OK | Invention Steel |
| 24 | 24 | B24 | 60 | 15 | 5.8 | 1.7 | 2091 | OK | Invention Steel |
| <u>25</u> | <u>25</u> | B25 | 58 | 13 | 6.8 | 1.6 | 2040 | <u>NG</u> | Comparative Steel |
| <u>26</u> | <u>26</u> | B26 | 60 | 15 | 5.8 | 2.0 | 2103 | <u>OK</u> | Invention Steel |
| 27 | 27 | B27 | 52 | 12 | 6.6 | 2.4 | 2028 | OK | Invention Steel |
| 28 | 28 | B28 | 50 | 10 | 7.0 | 2.2 | 2122 | OK | Invention Steel |
| 29 | 29 | B29 | 53 | 15 | 7.5 | 1.8 | 2142 | OK | Invention Steel |
| <u>30</u> | <u>30</u> | B30 | 51 | 11 | 6.8 | 1.6 | 2078 | <u>NG</u> | Comparative Steel |

TABLE 15

| | | | Heat treatment step during hot stamping | | | | | |
|---|---|---|---|---|---|---|---|---|
| Steel No. | Steel sheet No. | Manufacturing No. | Average heating rate (° C./s) | Holding temperature (° C.) | Elapsed time from start of heating to forming (s) | Tempering temperature (° C.) | Partially softened region | Note |
| 31 | 31 | B31 | 158 | 909 | 232 | Absent | Absent | Comparative Steel |
| 32 | 32 | B32 | 152 | 912 | 227 | Absent | Absent | Invention Steel |
| 33 | 33 | B33 | 137 | 916 | 223 | Absent | Absent | Invention Steel |
| 34 | 34 | B34 | 140 | 899 | 253 | Absent | Absent | Invention Steel |
| 35 | 35 | B35 | 127 | 901 | 240 | Absent | Absent | Invention Steel |
| 36 | 36 | B36 | 134 | 907 | 223 | Absent | Absent | Comparative Steel |
| 37 | 37 | B37 | 149 | 913 | 234 | Absent | Absent | Invention Steel |
| 38 | 38 | B38 | 142 | 911 | 259 | Absent | Absent | Invention Steel |
| 39 | 39 | B39 | 152 | 890 | 253 | Absent | Absent | Invention Steel |
| 40 | 40 | B40 | 121 | 910 | 237 | Absent | Absent | Comparative Steel |
| 41 | 41 | B41 | 133 | 884 | 257 | Absent | Absent | Invention Steel |
| 42 | 42 | B42 | 157 | 885 | 257 | Absent | Absent | Invention Steel |
| 43 | 43 | B43 | 136 | 885 | 221 | Absent | Absent | Invention Steel |
| 44 | 44 | B44 | 135 | 905 | 249 | Absent | Absent | Invention Steel |
| 45 | 45 | B45 | 120 | 907 | 226 | Absent | Absent | Invention Steel |
| 46 | 46 | B46 | 131 | 889 | 229 | Absent | Absent | Invention Steel |
| 47 | 47 | B47 | 157 | 902 | 231 | Absent | Absent | Invention Steel |
| 48 | 48 | B48 | 151 | 888 | 249 | Absent | Absent | Invention Steel |
| 49 | 49 | B49 | 156 | 913 | 247 | Absent | Absent | Invention Steel |
| 50 | 50 | B50 | 129 | 886 | 223 | Absent | Absent | Invention Steel |
| 51 | 51 | B51 | 144 | 914 | 243 | Absent | Absent | Invention Steel |
| 52 | 52 | B52 | 132 | 882 | 230 | Absent | Absent | Invention Steel |
| 53 | 53 | B53 | 131 | 896 | 230 | Absent | Absent | Invention Steel |
| 54 | 54 | B54 | 129 | 910 | 246 | Absent | Absent | Invention Steel |
| 55 | 55 | B55 | 137 | 884 | 235 | Absent | Absent | Invention Steel |
| 56 | 56 | B56 | 150 | 917 | 226 | Absent | Absent | Invention Steel |
| 57 | 57 | B57 | 140 | 914 | 249 | Absent | Absent | Invention Steel |

TABLE 16

| | | | | | Microstructure of hot-stamping formed body | | Mechanical properties | | |
|---|---|---|---|---|---|---|---|---|---|
| Steel No. | Steel sheet No. | Manufacturing No. | Plating adhesion amount (g/m²) | Ni content in plating layer (mass %) | Average grain size of prior austenite grains (μm) | Ni concentration per unit area at grain boundaries having crystal orientation difference of 15° or more (mass %/μm²) | Tensile strength (MPa) | Hydrogen embrittlement resistance | Note |
| 31 | 31 | B31 | 46 | 16 | 6.9 | 1.6 | 2020 | NG | Comparative Steel |
| 32 | 32 | B32 | 40 | 16 | 7.5 | 1.6 | 2117 | OK | Invention Steel |
| 33 | 33 | B33 | 43 | 13 | 6.9 | 2.1 | 2025 | OK | Invention Steel |
| 34 | 34 | B34 | 46 | 16 | 5.6 | 1.6 | 2036 | OK | Invention Steel |
| 35 | 35 | B35 | 51 | 14 | 5.4 | 1.5 | 2115 | OK | Invention Steel |
| 36 | 36 | B36 | 47 | 13 | 5.4 | 1.6 | 2018 | NG | Comparative Steel |
| 37 | 37 | B37 | 52 | 12 | 6.1 | 1.8 | 2035 | OK | Invention Steel |
| 38 | 38 | B38 | 46 | 17 | 6.6 | 1.5 | 2028 | OK | Invention Steel |
| 39 | 39 | B39 | 60 | 16 | 6.6 | 2.0 | 2120 | OK | Invention Steel |
| 40 | 40 | B40 | 60 | 17 | 5.8 | 1.7 | 2047 | NG | Comparative Steel |
| 41 | 41 | B41 | 45 | 15 | 6.4 | 1.8 | 2133 | OK | Invention Steel |
| 42 | 42 | B42 | 58 | 15 | 5.9 | 2.1 | 2153 | OK | Invention Steel |
| 43 | 43 | B43 | 59 | 12 | 6.3 | 2.0 | 2138 | OK | Invention Steel |
| 44 | 44 | B44 | 45 | 17 | 7.9 | 1.7 | 2191 | OK | Invention Steel |
| 45 | 45 | B45 | 42 | 17 | 6.0 | 1.7 | 2111 | OK | Invention Steel |
| 46 | 46 | B46 | 58 | 16 | 7.6 | 1.5 | 2185 | OK | Invention Steel |
| 47 | 47 | B47 | 42 | 14 | 5.5 | 2.1 | 2135 | OK | Invention Steel |
| 48 | 48 | B48 | 48 | 13 | 7.0 | 1.5 | 2213 | OK | Invention Steel |
| 49 | 49 | B49 | 58 | 12 | 6.5 | 1.5 | 2113 | OK | Invention Steel |
| 50 | 50 | B50 | 42 | 10 | 7.5 | 1.7 | 2135 | OK | Invention Steel |
| 51 | 51 | B51 | 51 | 15 | 5.8 | 1.9 | 2183 | OK | Invention Steel |
| 52 | 52 | B52 | 60 | 10 | 5.5 | 2.4 | 2138 | OK | Invention Steel |
| 53 | 53 | B53 | 49 | 11 | 6.9 | 2.4 | 2045 | OK | Invention Steel |
| 54 | 54 | B54 | 40 | 16 | 6.4 | 2.4 | 2049 | OK | Invention Steel |
| 55 | 55 | B55 | 54 | 10 | 7.6 | 2.4 | 2119 | OK | Invention Steel |

TABLE 16-continued

| | | | Microstructure of hot-stamping formed body | | | | | |
|---|---|---|---|---|---|---|---|---|
| | | | | | Ni concentration per unit area at grain boundaries having crystal orientation difference of 15° or more (mass %/μm²) | Mechanical properties | | |
| | | | Plating adhesion amount (g/m²) | Ni content in plating layer (mass %) | Average grain size of prior austenite grains (μm) | | | |
| Steel No. | Steel sheet No. | Manufacturing No. | | | | | Tensile strength (MPa) | Hydrogen embrittlement resistance | Note |
| 56 | 56 | B56 | 44 | 14 | 7.3 | 1.5 | 2070 | OK | Invention Steel |
| 57 | 57 | B57 | 46 | 17 | 7.7 | 1.5 | 2010 | OK | Invention Steel |

TABLE 17

| | | | Heat treatment step during hot stamping | | | | | |
|---|---|---|---|---|---|---|---|---|
| Steel No. | Steel sheet No. | Manufacturing No. | Average heating rate (° C./s) | Holding temperature (° C.) | Elapsed time from start of heating to forming (s) | Tempering temperature (° C.) | Partially softened region | Note |
| 7 | 58 | B58 | 151 | 915 | 242 | Absent | Absent | Comparative Steel |
| 7 | 59 | B59 | 126 | 913 | 228 | Absent | Absent | Invention Steel |
| 7 | 60 | B60 | 145 | 885 | 233 | Absent | Absent | Comparative Steel |
| 7 | 61 | B61 | 124 | 903 | 229 | Absent | Absent | Invention Steel |
| 7 | 62 | B62 | 133 | 894 | 231 | Absent | Absent | Comparative Steel |
| 7 | 63 | B63 | 130 | 883 | 224 | Absent | Absent | Invention Steel |
| 7 | 64 | B64 | 128 | 897 | 234 | Absent | Absent | Comparative Steel |
| 7 | 65 | B65 | 141 | 901 | 221 | Absent | Absent | Invention Steel |
| 7 | 66 | B66 | 157 | 910 | 223 | Absent | Absent | Invention Steel |
| 7 | 67 | B67 | 140 | 889 | 235 | Absent | Absent | Invention Steel |
| 7 | 68 | B68 | 126 | 887 | 227 | Absent | Absent | Comparative Steel |
| 7 | 69 | B69 | 121 | 894 | 239 | Absent | Absent | Invention Steel |
| 7 | 70 | B70 | 145 | 920 | 246 | Absent | Absent | Invention Steel |
| 7 | 71 | B71 | 136 | 912 | 253 | Absent | Absent | Comparative Steel |
| 7 | 72 | B72 | 134 | 886 | 227 | Absent | Absent | Comparative Steel |
| 7 | 73 | B73 | 159 | 895 | 252 | Absent | Absent | Invention Steel |
| 7 | 74 | B74 | 144 | 889 | 225 | Absent | Absent | Invention Steel |
| 7 | 75 | B75 | 145 | 917 | 225 | Absent | Absent | Comparative Steel |
| 7 | 76 | B76 | 130 | 901 | 234 | Absent | Absent | Invention Steel |
| 7 | 77 | B77 | 131 | 883 | 221 | Absent | Absent | Invention Steel |
| 7 | 78 | B78 | 157 | 912 | 240 | Absent | Absent | Invention Steel |
| 7 | 79 | B79 | 149 | 885 | 254 | Absent | Absent | Comparative Steel |
| 7 | 80 | B80 | 148 | 890 | 227 | Absent | Absent | Comparative Steel |
| 7 | 81 | B81 | 160 | 885 | 225 | Absent | Absent | Invention Steel |
| 7 | 82 | B82 | 141 | 898 | 227 | Absent | Absent | Invention Steel |
| 7 | 83 | B83 | 151 | 909 | 224 | Absent | Absent | Invention Steel |
| 7 | 84 | B84 | 131 | 882 | 237 | Absent | Absent | Invention Steel |
| 7 | 85 | B85 | 109 | 896 | 248 | Absent | Absent | Invention Steel |
| 7 | 86 | B86 | 144 | 908 | 220 | Absent | Absent | Invention Steel |
| 7 | 87 | B87 | 191 | 912 | 260 | Absent | Absent | Invention Steel |
| 7 | 88 | B88 | 219 | 907 | 237 | Absent | Absent | Comparative Steel |
| 7 | 89 | B89 | 123 | 799 | 227 | Absent | Absent | Comparative Steel |
| 7 | 90 | B90 | 138 | 881 | 1011 | Absent | Absent | Comparative Steel |
| 7 | 91 | B91 | 152 | 884 | 241 | 201 | Absent | Invention Steel |
| 7 | 92 | B92 | 158 | 918 | 242 | Absent | Present | Invention Steel |

TABLE 18

| Steel No. | Steel sheet No. | Manufacturing No. | Plating adhesion amount (g/m²) | Ni content in plating layer (mass %) | Microstructure of hot-stamping formed body | | Mechanical properties | | Note |
|---|---|---|---|---|---|---|---|---|---|
| | | | | | Average grain size of prior austenite grains (μm) | Ni concentration per unit area at grain boundaries having crystal orientation difference of 15° or more (mass %/μm²) | Tensile strength (MPa) | Hydrogen embrittlement resistance | |
| 7 | 58 | B58 | 58 | 17 | 5.9 | 0.6 | 2105 | NG | Comparative Steel |
| 7 | 59 | B59 | 54 | 17 | 5.5 | 2.2 | 2081 | OK | Invention Steel |
| 7 | 60 | B60 | 59 | 11 | 6.1 | 0.9 | 2104 | NG | Comparative Steel |
| 7 | 61 | B61 | 41 | 16 | 8.0 | 2.2 | 2090 | OK | Invention Steel |
| 7 | 62 | B62 | 54 | 14 | 6.3 | 0.7 | 2014 | NG | Comparative Steel |
| 7 | 63 | B63 | 51 | 13 | 7.8 | 1.9 | 2019 | OK | Invention Steel |
| 7 | 64 | B64 | 42 | 13 | 6.4 | 0.5 | 2015 | NG | Comparative Steel |
| 7 | 65 | B65 | 43 | 17 | 8.0 | 2.0 | 2081 | OK | Invention Steel |
| 7 | 66 | B66 | 44 | 11 | 5.7 | 2.3 | 2041 | OK | Invention Steel |
| 7 | 67 | B67 | 49 | 10 | 6.1 | 1.7 | 2017 | OK | Invention Steel |
| 7 | 68 | B68 | 44 | 17 | 5.5 | 0.7 | 2149 | NG | Comparative Steel |
| 7 | 69 | B69 | 43 | 11 | 5.3 | 2.5 | 2121 | OK | Invention Steel |
| 7 | 70 | B70 | 60 | 10 | 5.5 | 2.1 | 2120 | OK | Invention Steel |
| 7 | 71 | B71 | 52 | 11 | 5.5 | 1.3 | 2011 | NG | Comparative Steel |
| 7 | 72 | B72 | 55 | 11 | 7.1 | 1.2 | 2088 | NG | Comparative Steel |
| 7 | 73 | B73 | 42 | 17 | 7.2 | 1.8 | 2136 | OK | Invention Steel |
| 7 | 74 | B74 | 45 | 15 | 8.0 | 1.9 | 2068 | OK | Invention Steel |
| 7 | 75 | B75 | 51 | 10 | 5.4 | 0.8 | 2053 | NG | Comparative Steel |
| 7 | 76 | B76 | 42 | 17 | 5.7 | 1.8 | 2093 | OK | Invention Steel |
| 7 | 77 | B77 | 50 | 14 | 5.7 | 2.1 | 2012 | OK | Invention Steel |
| 7 | 78 | B78 | 45 | 17 | 7.3 | 1.7 | 2087 | OK | Invention Steel |
| 7 | 79 | B79 | 54 | 15 | 5.6 | 0.7 | 2072 | NG | Comparative Steel |
| 7 | 80 | B80 | 45 | 10 | 7.2 | 0.9 | 2030 | NG | Comparative Steel |
| 7 | 81 | B81 | 40 | 10 | 5.6 | 1.8 | 2053 | OK | Invention Steel |
| 7 | 82 | B82 | 52 | 10 | 7.6 | 2.1 | 2087 | OK | Invention Steel |
| 7 | 83 | B83 | 49 | 12 | 5.6 | 2.1 | 2067 | OK | Invention Steel |
| 7 | 84 | B84 | 40 | 12 | 5.0 | 1.9 | 2036 | OK | Invention Steel |
| 7 | 85 | B85 | 50 | 13 | 6.3 | 1.5 | 2070 | OK | Invention Steel |
| 7 | 86 | B86 | 40 | 17 | 7.3 | 1.8 | 2057 | OK | Invention Steel |
| 7 | 87 | B87 | 52 | 10 | 6.1 | 2.3 | 2114 | OK | Invention Steel |
| 7 | 88 | B88 | 49 | 11 | 7.5 | 1.7 | 2080 | NG | Comparative Steel |
| 7 | 89 | B89 | 55 | 11 | 6.1 | 2.3 | 2094 | NG | Comparative Steel |
| 7 | 90 | B90 | 45 | 15 | 5.6 | 2.4 | 2101 | NG | Comparative Steel |
| 7 | 91 | B91 | 45 | 17 | 6.6 | 2.2 | 2113 | OK | Invention Steel |
| 7 | 92 | B92 | 45 | 10 | 5.4 | 1.7 | 2083 | OK | Invention Steel |

TABLE 19

| Steel No. | Steel sheet No. | Manufacturing No. | Heat treatment step during hot stamping | | | | | Note |
|---|---|---|---|---|---|---|---|---|
| | | | Average heating rate (°C./s) | Holding temperature (°C.) | Elapsed time from start of heating to forming (s) | Tempering temperature (°C.) | Partially softened region | |
| 58 | 93 | B93 | 124 | 910 | 224 | Absent | Absent | Invention Steel |
| 59 | 94 | B94 | 128 | 920 | 223 | Absent | Absent | Invention Steel |
| 60 | 95 | B95 | 140 | 912 | 246 | Absent | Absent | Invention Steel |
| 61 | 96 | B96 | 121 | 917 | 252 | Absent | Absent | Invention Steel |
| 7 | 97 | B97 | 136 | 912 | 221 | Absent | Absent | Invention Steel |
| 7 | 98 | B98 | 130 | 919 | 227 | Absent | Absent | Invention Steel |
| 7 | 99 | B99 | 109 | 907 | 231 | Absent | Absent | Invention Steel |
| 7 | 100 | B100 | 144 | 910 | 220 | Absent | Absent | Invention Steel |

TABLE 20

| Steel No. | Steel sheet No. | Manufacturing No. | Plating adhesion amount (g/m²) | Ni content in plating layer (mass %) | Average grain size of prior austenite grains (μm) | Ni concentration per unit area at grain boundaries having crystal orientation difference of 15° or more (mass %/μm²) | Tensile strength (MPa) | Hydrogen embrittlement resistance | Note |
|---|---|---|---|---|---|---|---|---|---|
| 58 | 93 | B93 | 42 | 11 | 6.6 | 1.9 | 1518 | OK | Invention Steel |
| 59 | 94 | B94 | 44 | 11 | 6.7 | 1.5 | 1587 | OK | Invention Steel |
| 60 | 95 | B95 | 43 | 11 | 6.3 | 1.7 | 1555 | OK | Invention Steel |
| 61 | 96 | B96 | 52 | 15 | 7.1 | 1.8 | 1561 | OK | Invention Steel |
| 7 | 97 | B97 | 42 | 17 | 7.4 | 2.3 | 2150 | OK | Invention Steel |
| 7 | 98 | B98 | 51 | 16 | 7.9 | 2.1 | 2109 | OK | Invention Steel |
| 7 | 99 | B99 | 42 | 17 | 8.0 | 2.4 | 2091 | OK | Invention Steel |
| 7 | 100 | B100 | 54 | 15 | 7.2 | 2.2 | 2089 | OK | Invention Steel |

The microstructure of the steel sheets for hot stamping and the hot-stamping formed bodies was measured by the above-mentioned measurement methods. The mechanical properties of the hot-stamping formed bodies were evaluated by the following methods.

"Tensile Strength"

The tensile strength of the hot-stamping formed body was obtained in accordance with the test method described in JIS Z 2241:2011 by producing a No. 5 test piece described in JIS Z 2201:2011 from any position in the hot-stamping formed body.

"Hydrogen Embrittlement Resistance"

Figure 2:
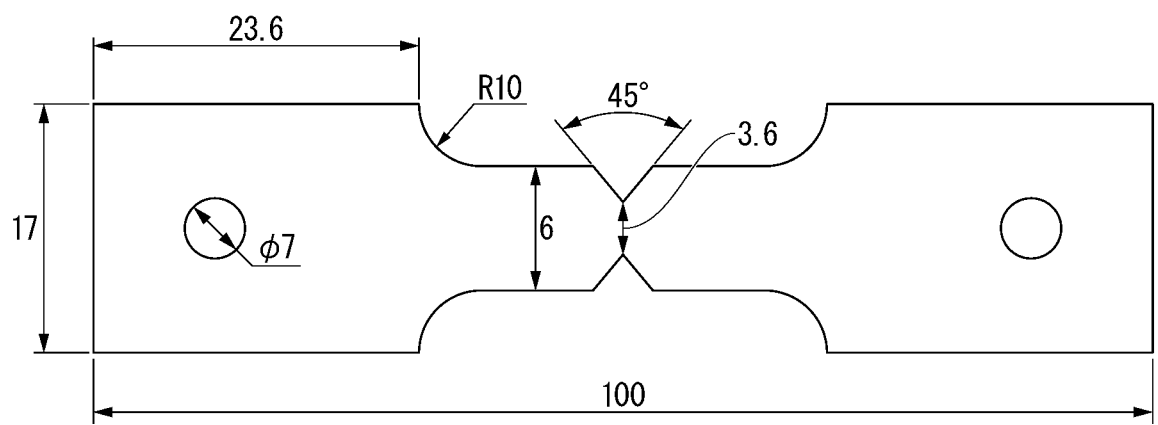
FIG. 2 is a diagram showing a test piece used for evaluating hydrogen embrittlement resistance of examples.

The hydrogen embrittlement resistance of the hot-stamping formed body was evaluated by the following method. FIG. 2 shows the shape of a test piece used for evaluating the hydrogen embrittlement resistance. The test piece of FIG. 2 to which a V notch was applied was subjected to 900 MPa in terms of a nominal stress calculated by dividing the load applied to the test piece by the cross-sectional area of the bottom of the notch, and immersed in an aqueous solution obtained by dissolving 3 g/l of ammonium thiocyanate in 3% saline solution at room temperature for 12 hours to be determined by the presence or absence of fracture. In the tables, a case without fracture is described as acceptable (OK), and a case with fracture is described as unacceptable (NG).

In a case where the tensile strength was 1,500 MPa or more and the hydrogen embrittlement resistance is acceptable (OK) was determined to be an invention example as being excellent in strength and hydrogen embrittlement resistance. In a case where any one of the above two performances was not satisfied, the case was determined to be a comparative example. In the invention examples, martensite in the surface layer region occupied 85% or more by area %, and the remainder in the microstructure contained one or more of residual austenite, ferrite, pearlite, granular bainite, and upper bainite.

Referring to Tables 14, 16, 18, and 20, it can be seen that a hot-stamping formed body in which the chemical composition, the plating composition, and the microstructure are within the ranges of the present invention has excellent strength and toughness or hydrogen embrittlement resistance.

On the other hand, it can be seen that a hot-stamping formed body in which any one or more of the chemical composition and the microstructure deviates from the present invention is inferior in one or more of strength and hydrogen embrittlement resistance.

INDUSTRIAL APPLICABILITY

According to the present invention, it is possible to provide a hot-stamping formed body having high strength and having better hydrogen embrittlement resistance than in the related art is obtained.

The invention claimed is:
1. A hot-stamping formed body comprising:
   a base steel sheet consisting of, as a chemical composition, by mass %,
   C: 0.15% or more and less than 0.70%,
   Si: 0.005% to 0.250%,
   Mn: 0.30% to 3.00%,
   sol. Al: 0.0002% to 0.500%,
   P: 0.100% or less,
   S: 0.1000% or less,
   N: 0.0100% or less,
   Nb: 0% to 0.150%,
   Ti: 0% to 0.150%,
   Mo: 0% to 1.000%,
   Cr: 0% to 1.000%,
   B: 0% to 0.0100%,
   Ca: 0% to 0.010%,
   REM: 0% to 0.30%, and
   a remainder consisting of Fe and impurities; and
   a plating layer provided on a surface of the base steel sheet, the plating layer having an adhesion amount of 10 g/m² to 90 g/m² and a composition consisting of Ni having a Ni content of 10 mass % to 25 mass % with a remainder of Zn and impurities,
   wherein, in a surface layer region, which is a region from the surface of the base steel sheet to a position at a depth of 50 μm from the surface, an average grain size of prior austenite grains is 10.0 μm or less, and a Ni concentration per unit area at grain boundaries having an average crystal orientation difference of 15° or more is 1.5 mass %/μm² or more, and
   fracture is absent in a case a test piece to which a V notch is applied is subjected to 900 MPa in terms of a nominal stress calculated by dividing a load applied to the test piece by a cross-sectional area of a bottom of the V notch and immersed in an aqueous solution obtained by dissolving 3 g/l of ammonium thiocyanate in 3% saline solution at room temperature for 12 hours.

2. A hot-stamping formed body comprising:

a base steel sheet containing, as a chemical composition, by mass %,

C: 0.15% or more and less than 0.70%,
Si: 0.005% to 0.250%,
Mn: 0.30% to 3.00%,
sol. Al: 0.0002% to 0.500%,
P: 0.100% or less,
S: 0.1000% or less,
N: 0.0100% or less,
Nb: 0% to 0.150%,
Ti: 0% to 0.150%,
Mo: 0% to 1.000%,
Cr: 0% to 1.000%,
B: 0% to 0.0100%,
Ca: 0% to 0.010%,
REM: 0% to 0.30%, and
a remainder comprising Fe and impurities; and a plating layer provided on a surface of the base steel sheet, the plating layer having an adhesion amount of 10 g/m$^2$ to 90 g/m$^2$ and a Ni content of 10 mass % to 25 mass %, and containing a remainder comprising Zn and impurities, wherein, in a surface layer region, which is a region from the surface of the base steel sheet to a position at a depth of 50 μm from the surface, an average grain size of prior austenite grains is 10.0 μm or less, and a Ni concentration per unit area at grain boundaries having an average crystal orientation difference of 15° or more is 1.5 mass %/μm$^2$ or more, and fracture is absent in a case a test piece to which a V notch is applied is subjected to 900 MPa in terms of a nominal stress calculated by dividing a load applied to the test piece by a cross-sectional area of a bottom of the V notch and immersed in an aqueous solution obtained by dissolving 3 g/l of ammonium thiocyanate in 3% saline solution at room temperature for 12 hours.

3. The hot-stamping formed body according to claim 2, comprising, as the chemical composition, by mass %, one or two or more of:

Nb: 0.010% to 0.150%;
Ti: 0.010% to 0.150%;
Mo: 0.005% to 1.000%;
Cr: 0.005% to 1.000%;
B: 0.0005% to 0.0100%;
Ca: 0.0005% to 0.010%; and
REM: 0.0005% to 0.30%.

* * * * *